US012469128B2

(12) United States Patent
Lorsakul et al.

(10) Patent No.: US 12,469,128 B2
(45) Date of Patent: Nov. 11, 2025

(54) NON-TUMOR SEGMENTATION TO SUPPORT TUMOR DETECTION AND ANALYSIS

(71) Applicant: Ventana Medical Systems, Inc., Tucson, AZ (US)

(72) Inventors: Auranuch Lorsakul, Tucson, AZ (US); Kien Nguyen, Tucson, AZ (US); Zuo Zhao, Tucson, AZ (US)

(73) Assignee: VENTANA MEDICAL SYSTEMS, INC., Tucson, AZ (US)

( * ) Notice: Subject to any disclaimer, the term of this patent is extended or adjusted under 35 U.S.C. 154(b) by 384 days.

(21) Appl. No.: 17/862,973

(22) Filed: Jul. 12, 2022

(65) Prior Publication Data

US 2022/0351379 A1    Nov. 3, 2022

Related U.S. Application Data

(63) Continuation of application No. PCT/US2021/013947, filed on Jan. 19, 2021.
(Continued)

(51) Int. Cl.
*G06T 7/00* (2017.01)
*G06T 7/11* (2017.01)

(52) U.S. Cl.
CPC .............. *G06T 7/0012* (2013.01); *G06T 7/11* (2017.01); *G06T 2207/20084* (2013.01); *G06T 2207/30024* (2013.01)

(58) Field of Classification Search
CPC ................ G06T 7/0012; G06T 7/11; G06T 2207/20084; G06T 2207/30024;
(Continued)

(56) References Cited

U.S. PATENT DOCUMENTS 7,760,927 B2      7/2010  Gholap et al.
2006/0083418 A1*  4/2006  Watson .................. G06V 20/69
                                               382/133
(Continued)

FOREIGN PATENT DOCUMENTS

CN    110088804 A        8/2019
CN    110675411 A *      1/2020    .......... G06K 9/6218
(Continued)

OTHER PUBLICATIONS

JP Application No. 2022-543485, "Office Action", Mailed on Aug. 15, 2023, 12 pages.
(Continued)

*Primary Examiner* — Carol W Chan
(74) *Attorney, Agent, or Firm* — Kilpatrick Townsend & Stockton LLP

(57) ABSTRACT

The present disclosure relates machine learning techniques for segmenting non-tumor regions in specimen images to support tumor detection and analysis. Particularly, aspects of the present disclosure are directed to accessing one or more images that comprise a non-target region (e.g., a non-tumor region) and a target region (e.g., a tumor region), predicting, by a two-dimensional segmentation model, segmentation maps for the non-target region based on discriminative features encoded from the one or more images, a segmentation mask for the one or more images based on the segmentation maps, applying the segmentation mask to the one or more images to generate non-target region masked images that exclude the non-target region from the one or more images, and classifying, by an image analysis model, a biological material or structure within the target region based on a set of features extracted from the non-target region masked images.

20 Claims, 13 Drawing Sheets
(4 of 13 Drawing Sheet(s) Filed in Color)

Related U.S. Application Data

(60) Provisional application No. 62/963,145, filed on Jan. 19, 2020.

(58) Field of Classification Search
CPC . G06T 2207/10056; G06T 2207/10064; G06T 2207/30096
See application file for complete search history.

(56) References Cited

U.S. PATENT DOCUMENTS

| | | |
|---|---|---|
| 2017/0103521 A1 | 4/2017 | Chukka et al. |
| 2017/0140246 A1 | 5/2017 | Barnes et al. |
| 2019/0392578 A1* | 12/2019 | Chukka ................ G06V 20/695 |

FOREIGN PATENT DOCUMENTS

| | | |
|---|---|---|
| JP | 2006517663 A | 7/2006 |
| JP | 2020502534 A | 1/2020 |
| WO | 2014102130 A1 | 7/2014 |
| WO | 2014140085 A1 | 9/2014 |
| WO | 2015049233 A1 | 4/2015 |
| WO | 2015181371 A1 | 12/2015 |
| WO | 2016120442 A1 | 8/2016 |
| WO | 2018115055 A1 | 6/2018 |
| WO | 2019110567 A1 | 6/2019 |

OTHER PUBLICATIONS

International Application No. PCT/US2021/013947, "International Preliminary Report on Patentability", Mailed on Jul. 28, 2022, 15 pages.

International Application No. PCT/US2021/013947, "International Search Report and Written Opinion", Mailed on Apr. 30, 2021, 19 pages.

JP Application No. 2022-543485, "Notice of Decision to Grant", Dec. 19, 2023, 6 pages.

Caicedo et al., "Evaluation of Deep Learning Strategies for Nucleus Segmentation in Fluorescence Images", NIH Public Access Author Manuscript. vol. 95, No. 9, Jul. 16, 2019, pp. 942-962.

Li et al., "A Multi-Scale U-Net for Semantic Segmentation of Histological Images from Radical Prostatectomies", AMIA Annual Symposium Proceedings, 2017, pp. 1140-1148.

Long et al., "Microscopy Cell Nuclei Segmentation with Enhanced U-Net", BMC Bioinformatics. vol. 21, No. 1, Jan. 8, 2020, 12 pages.

Oskal et al., "A U-Net Based Approach to Epidermal Tissue Segmentation in Whole Slide Histopathological Images", SN Applied Sciences, vol. 1, No. 672, Jun. 7, 2019, 12 pages.

Su et al., "Automatic Detection of Cervical Cancer Cells by a Two-Level Cascade Classification System", Analytical Cellular Pathology. vol. 2016, 2016, pp. 1-11.

Parvin, Bahram, et al. "Iterative voting for inference of structural saliency and characterization of subcellular events." Image Processing, IEEE Transactions on 16.3 (2007): 615-623.

Cuzick, et al., "Prognostic Value of a Combined Estrogen Receptor, Progesterone Receptor, Ki-67, and Human Epidermal Growth Factor Receptor 2 Immunohistochemical Score and Comparison with the Genomic Health Recurrence Score in Early Breast Cancer", Journal of Clinical Oncology, vol. 29, No. 32, 2011, 4273-4278.

Barton, et al., "Assessment of the Contribution of the IHC4 + C Score to Decision Making in Clinical Practice in Early Breast Cancer", British Journal of Cancer, 2012 106, 1760-1765.

CN Application No. 202180008998.8 "Office Action", Nov. 23, 2024, 19 pages.

CN Application No. 202180008998.8, "Office Action", Jul. 11, 2025, 5 pages.

Ronneberger et al., "U-Net: Convolutional Networks for Biomedical Image Segmentation", Computer Science Department and BIOSS Centre for Biological Signalling Studies, University of Freiburg, Germany Available online at: https://arxiv.org/pdf/1505.04597, May 18, 2015, pp. 1-8.

* cited by examiner

NON-TUMOR SEGMENTATION TO SUPPORT TUMOR DETECTION AND ANALYSIS

CROSS-REFERENCE TO RELATED APPLICATIONS

The present application is a continuation filed under 35 U.S.C. § 111(a), which claims priority and benefit from International Application PCT/US2021/013947, filed Jan. 19, 2021, which claims priority and benefit to U.S. Provisional Application No. 62/963,145, filed on Jan. 19, 2020. Each of the above patent applications is incorporated herein by reference in its entirety for all purposes.

FIELD

The present disclosure relates to digital pathology, and in particular to machine learning techniques for segmenting non-tumor regions in specimen images to support or improve tumor detection and analysis.

BACKGROUND

Digital pathology involves scanning of pathology slides comprising tissue and/or cells (e.g., histopathology or cytopathology glass slides) into digital images. The tissue and/or cells within the digital images may be subsequently examined by digital pathology image analysis and/or interpreted by a pathologist for a variety of reasons including diagnosis of disease, assessment of a response to therapy, and the development of pharmalogical agents to fight disease. In order to examine the tissue and/or cells within the digital images (which are virtually transparent), the pathology slides may be prepared using colored stains (e.g., immunostains) that bind selectively to tissue and/or cellular components. Immunohistochemistry (IHC) is a common application of immunostaining and involves the process of selectively identifying antigens (proteins) in cells of a tissue section by exploiting the principle of antibodies and other compounds (or substances) binding specifically to antigens in biological tissues. In some assays, the target antigen in the specimen to a stain may be referred to as a biomarker. Thereafter, digital pathology image analysis can be performed on digital images of the stained tissue and/or cells to identify and quantify staining for antigens (e.g., biomarkers indicative of tumor cells) in biological tissues.

Machine learning techniques have shown great promise in digital pathology image analysis, such as in tumor region identification, metastasis detection, and patient prognosis. Many computing systems provisioned with machine learning techniques, including convolutional neural networks (CNNs), have been proposed for image classification and digital pathology image analysis, such as tumor region and metastasis detection. For example, CNNs can have a series of convolution layers as the hidden layers and this network structure enables the extraction of representational features for object/image classification and digital pathology image analysis. In addition to object/image classification, machine learning techniques have also been implemented for image segmentation. Image segmentation is the process of partitioning a digital image into multiple segments (sets of pixels, also known as image objects). The goal of segmentation is to simplify and/or change the representation of an image into something that is more meaningful and easier to analyze. For example, image segmentation is typically used to locate objects such as tumors and boundaries (lines, curves, etc.) in images. To perform image segmentation for large data (e.g., whole slide pathology images), the image is first divided into many small patches. A computing system provisioned with machine learning techniques is trained to classify these patches, and all patches in a same class are combined into one segmented area. Thereafter, machine learning techniques may be further implemented to predict or classify the segmented area (e.g., negative tumor cells or tumor cells that have no stain expression) based on representational features associated with the segmented area.

SUMMARY

In various embodiments, a computer-implemented method is provided comprising: accessing a plurality images for a specimen, where one or more images of the plurality images comprise a non-target region and a target region; predicting, by a two-dimensional segmentation model, segmentation maps for the non-target region based on discriminative features encoded from the one or more images, where the discriminative features are associated with a first biological material or structure; generating a segmentation mask for the one or more images based on the segmentation maps; applying the segmentation mask to the one or more images to generate non-target region masked images that exclude the non-target region from the one or more images; classifying, by an image analysis model, a second biological material or structure within the target region as a type of cell or cell nuclei based on a set of features extracted from the non-target region masked images; and providing, for the target region, the type of cell or cell nuclei classified for the second biological material or structure.

In some embodiments, the specimen is stained for one or more biomarkers, the first biological material or structure is a lymphoid aggregate or cluster of immune cells, and the second biological material or structure is a tumor cell or cluster of tumor cells.

In some embodiments, the computer-implemented method further comprises: splitting the one or more images into image patches having a predetermined size; encoding, by the two-dimensional segmentation model, the image patches into the discriminative features; projecting, by the two-dimensional segmentation model, the discriminate features onto a pixel space; and determining, by the two-dimensional segmentation model, a classification of the first biological material or structure for each pixel space based on a predetermined threshold.

In some embodiments, the computer-implemented method further comprises: extracting, by the image analysis model, the set of features from the non-target region masked images; and computing one or more metrics for the second biological material or structure based on the set of features, where the providing the type of cell or cell nuclei classified for the second biological material or structure further comprises providing the one or more metrics for the second biological material or structure.

In some embodiments, the two-dimensional segmentation model is a modified U-Net model comprising a contracting path and an expansive path, each of the contracting path and the expansive path having a maximum of 256 channels, and one or more layers of the contracting path implement spatial drop out.

In various embodiments, a computer-implements method is provided comprising: accessing a plurality images for a specimen, where one or more images of the plurality images comprise a non-target region and a target region; predicting, by a two-dimensional segmentation model, segmentation maps for the non-target region based on discriminative features encoded from the one or more images, where the discriminative features are associated with a first biological material or structure; generating a first segmentation mask for the one or more images based on the segmentation maps for the non-target region; classifying, by an image analysis model, a second biological material or structure within the target region as a type of cell or cell nuclei based on a second set of features extracted from the one or more images; generating a second segmentation mask for the one or more images based on the classification of the second biological material or structure within the target region; applying the first segmentation mask and the second segmentation mask to the one or more images to generate target region and non-target region masked images that exclude the non-target region from the one or more images; and providing the target region and non-target region masked images and the type of cell or cell nuclei classified for the second biological material or structure.

In some embodiments, the specimen is stained for one or more biomarkers, the first biological material or structure is a lymphoid aggregate or cluster of immune cells, and the second biological material or structure is a tumor cell or cluster of tumor cells.

In some embodiments, the computer-implemented method further comprises: splitting the one or more images into image patches having a predetermined size; encoding, by the two-dimensional segmentation model, the image patches into the discriminative features; projecting, by the two-dimensional segmentation model, the discriminate features onto a pixel space; and determining, by the two-dimensional segmentation model, a classification of the first biological material or structure for each pixel space based on a predetermined threshold.

In some embodiments, the computer-implemented method further comprises: extracting, by the image analysis model, the set of features from the one or more images; and computing one or more metrics for the second biological material or structure based on the set of features, where the providing the target region and non-target region masked images and the type of cell or cell nuclei classified for the second biological material or structure further comprises providing the one or more metrics for the second biological material or structure.

In some embodiments, the two-dimensional segmentation model is a modified U-Net model comprising a contracting path and an expansive path, each of the contracting path and the expansive path having a maximum of 256 channels, and one or more layers of the contracting path implement spatial drop out.

In various embodiments, a computer-implements method is provided comprising: accessing a plurality tile images for a specimen, where one or more tile images of the plurality tile images comprise annotations to segment non-target regions and target regions; training a two-dimensional segmentation model on the one or more tile images, where the training comprises: performing iterative operations to find a set of parameters for the two-dimensional segmentation model that minimizes a loss function for the two-dimensional segmentation model, where each iteration involves finding the set of parameters for the two-dimensional segmentation model so that a value of the loss function using the set of parameters is smaller than a value of the loss function using another set of parameters in a previous iteration, and where the loss function is constructed to measure a difference between outputs predicted using the two-dimensional segmentation model and the annotations contained in the one or more tile images; and providing the trained two-dimensional segmentation model.

In some embodiments, the computer implemented method further comprises splitting the one or more tile images into patches of a size of 256 pixels×256 pixels, where the two-dimensional segmentation model is trained on the patches.

In some embodiments, the two-dimensional segmentation model is a modified U-Net model comprising contracting path and an expansive path, each of the contracting path and the expansive path having a maximum of 256 channels, and one or more layers of the contracting path implement spatial drop out.

In some embodiments, the training further comprises adjusting a learning rate of the modified U-Net by reducing the learning rate according to a predefined schedule.

In some embodiments, the predefined schedule is a step decay schedule that drops the learning rate by a predetermined factor every predetermined number of epochs for optimizing the loss function, and where the loss function is a binary cross entropy loss function.

In some embodiments, a system is provided that includes one or more data processors and a non-transitory computer readable storage medium containing instructions which, when executed on the one or more data processors, cause the one or more data processors to perform part or all of one or more methods disclosed herein.

In some embodiments, a computer-program product is provided that is tangibly embodied in a non-transitory machine-readable storage medium and that includes instructions configured to cause one or more data processors to perform part or all of one or more methods disclosed herein.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The present disclosure is described in conjunction with the appended figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

I. Overview

The present disclosure describes techniques for automated non-tumor segmentation. More specifically, some embodiments of the present disclosure provide machine learning techniques for segmenting non-tumor regions in specimen images to support or improve tumor detection and analysis.

Figure 1:
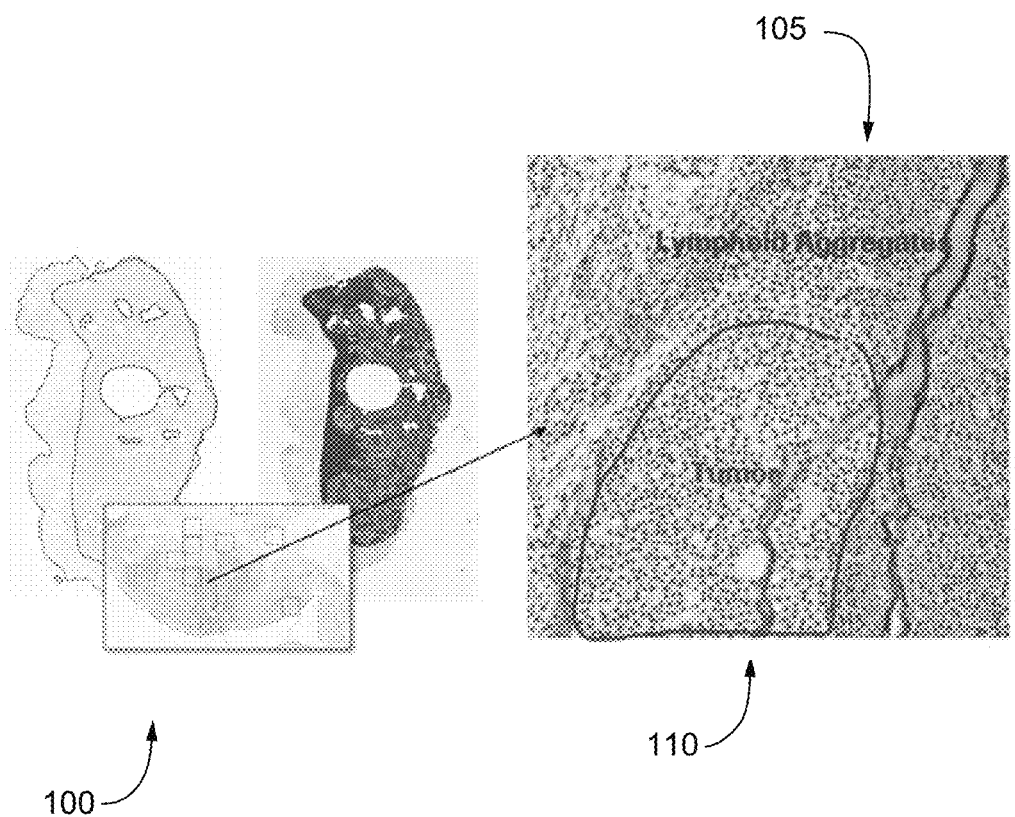
FIG. 1 shows non-target regions (e.g., lymphoid aggregate regions or group of immune cells) and target regions (e.g., negative tumor cells) within a same image according to various embodiments.

Immunohistochemical (IHC) slide staining can be utilized to identify proteins in cells of a tissue section and hence is widely used in the study of different types of cells, such as cancerous cells and immune cells in biological tissue. It is possible to assess the IHC stained cells of a tissue section under a microscope at high magnification and/or to automatically analyze digital images of the biological specimen with a digital pathology algorithm. Often, in whole slide analysis, the assessment of the stained biological specimen requires segmentation of regions of the stained biological specimen including identification of target regions (e.g., positive and negative tumor cells) and the exclusion of non-target regions (e.g., normal tissue or blank slide regions). In some instances, the non-target regions to be excluded comprise biological material or structures that can be very difficult to differentiate from other biological material or structures of target regions, and thus exclude from the assessment of the biological specimen. For example, lymphoid aggregates are clusters of immune cells and their morphology and staining characteristics can be very similar to negative tumor cells. FIG. 1 shows a region 100 of a stained pathology slide comprising a cluster 105 of immune cells (e.g., a lymphoid aggregate) located next to a cluster 110 of negative stained tumor cells. The cluster 105 of immune cells have a morphology and staining characteristics that is very similar to the cluster 110 of negative stained tumor cells, and thus it can be very difficult to differentiate a lymphoid aggregate from negative stained tumor cells. As a result, in such instances a pathologist typically provides manual tumor annotations while excluding non-target regions. However, manual tumor annotations are subject to error, pathologist bias, and laborious due to large size of the whole slide images at high magnification and the large volume of data to be processed.

Automated segmentation of tumors and substructures from digital images has a potential for accurate and reproducible delineation of the tumors and tumor cells, which can help more efficient and better diagnosis, surgical planning and treatment assessment of tumors. Most automated tumor segmentation methods use hand designed features that focus on characteristics of the tumor cells. These methods implement a classical machine learning pipeline according to which features of images are first extracted and then given to a classifier whose training procedure does not affect the nature of those features. An alternative approach for designing task-adapted feature representations is to learn a hierarchy of increasingly complex features directly from in-domain data. However, in both instances, accurate automated segmentation of the tumor or tumor cells from whole slide images is a challenging task for a number of reasons. First, the boundary between tumor and normal tissues (especially lymphoid aggregate regions) is often ambiguous due to specific and nonspecific staining, heterogeneity in low resolution images, sparse signaling (e.g., less than approximately 1% of the image), and the sheer amount of biological material or structures to be differentiated within whole slide images. Second, tumors and tumor cells can vary largely across patients in terms of size, shape, and localization. This prohibits the use of strong priors on shape and localization that are commonly used for robust image analysis in many other applications, such as facial recognition or navigation. As a result, conventional image analysis algorithms usually provide undesired detection results (e.g., over-detection or miss-classification) of these difficult regions (e.g., lymphoid aggregate regions) as negative tumor cells.

To address these limitations and problems, the techniques for automated non-tumor segmentation of the present embodiments include the use of a machine learning architecture that is fast and allows for the model to deal with both size and the highly unbalanced nature of regional and whole slide images. One illustrative embodiment of the present disclosure is directed to a computer-implemented method for automatically detecting and excluding non-target regions (e.g., lymphoid aggregate regions) or masking out these non-target regions on whole slide images. In some instances, the method is performed as part of pre-processing before performing an image analysis algorithm to segment and classify target regions within the images (e.g., tumor cells). In other instances, the method is performed as part of post-processing after performing an image analysis algorithm to segment and classify the target regions within the images (e.g., tumor cells). However, as should be understood by one of ordinary skill in the art, the concepts discussed herein are not limited to pre-processing or post-processing procedures, but may also be integrated into the overall image analysis processing in accordance with various embodiments.

The computer-implemented method may include the use of a convolutional neural network (CNN) architecture or model that utilizes a two-dimensional segmentation model (a modified U-Net) to automatically detect and exclude biological structures or non-tumor cells such as clusters of immune cells or lymphoid aggregate regions or mask out these non-target regions on whole slide images before performing a standard image analysis algorithm to learn and recognize target regions. However, this disclosure is not limited to segmenting out only clusters of immune cells or lymphoid aggregate regions, the techniques described herein may also be applied to distinguish other non-target or non-tumor areas e.g., scanner artifacts, narcosis, etc. The convolutional neural network architecture or model may be trained using pre-labeled images of the non-target regions (e.g., lymphoid aggregate regions, necrosis, artifacts, and other cells) and target regions (e.g., tumor cells or staining expression targets). Consequently, a trained convolutional neural network architecture or model may be used to segment the non-target regions, which can then be masked out from the whole slide analysis before, during, or after inputting images to an image analysis algorithm. The image analysis algorithm performs classification tasks and outputs tumor readouts for the target regions. Advantageously, this proposed architecture and techniques can improve accuracy of tumor cell classification via the image analysis algorithm and reduce a chance to over-detect or miss-classify these difficult non-target regions (e.g., lymphoid aggregate regions) as target regions (e.g., negative tumor cells).

II. Definitions

As used herein, when an action is "based on" something, this means the action is based at least in part on at least a part of the something.

As used herein, the terms "substantially," "approximately" and "about" are defined as being largely but not necessarily wholly what is specified (and include wholly what is specified) as understood by one of ordinary skill in the art. In any disclosed embodiment, the term "substantially," "approximately," or "about" may be substituted with "within [a percentage] of" what is specified, where the percentage includes 0.1, 1, 5, and 10 percent.

As used herein, the term "sample" "biological sample" or "tissue sample" refers to any sample including a biomolecule (such as a protein, a peptide, a nucleic acid, a lipid, a carbohydrate, or a combination thereof) that is obtained from any organism including viruses. Other examples of organisms include mammals (such as humans; veterinary animals like cats, dogs, horses, cattle, and swine; and laboratory animals like mice, rats and primates), insects, annelids, arachnids, marsupials, reptiles, amphibians, bacteria, and fungi. Biological samples include tissue samples (such as tissue sections and needle biopsies of tissue), cell samples (such as cytological smears such as Pap smears or blood smears or samples of cells obtained by microdissection), or cell fractions, fragments or organelles (such as obtained by lysing cells and separating their components by centrifugation or otherwise). Other examples of biological samples include blood, serum, urine, semen, fecal matter, cerebrospinal fluid, interstitial fluid, mucous, tears, sweat, pus, biopsied tissue (for example, obtained by a surgical biopsy or a needle biopsy), nipple aspirates, cerumen, milk, vaginal fluid, saliva, swabs (such as buccal swabs), or any material containing biomolecules that is derived from a first biological sample. In certain embodiments, the term "biological sample" as used herein refers to a sample (such as a homogenized or liquefied sample) prepared from a tumor or a portion thereof obtained from a subject.

As used herein, the term "biological material or structure" refers to natural materials or structures that comprise a whole or a part of a living structure (e.g., a cell nucleus, a cell membrane, cytoplasm, a chromosome, DNA, a cell, a cluster of cells, or the like).

As used herein, the term "non-target region" refers to a region of an image having image data that is not intended to be assessed in an image analysis process. Non-target regions may include non-tissue regions of an image corresponding to a substrate such as glass with no sample, for example where there exists only white light from the imaging source. Non-target regions may additionally or alternatively include tissue regions of an image corresponding to biological material or structures that are not intended to be analyzed in the image analysis process or difficult to differentiate from biological material or structures within target regions (e.g., lymphoid aggregates, cluster of immune cells, necrosis, stromal cells, normal cells, scanning artifacts).

As used herein, the term "target region" refers to a region of an image including image data that is intended be assessed in an image analysis process. Target regions include any region such as tissue regions of an image that is intended to be analyzed in the image analysis process (e.g., tumor cells or staining expressions).

As used herein, the term "tile" or "tile image" refers to a single image corresponding to a portion of a whole image, or a whole slide. In some embodiments, "tile" or "tile image" refers to a region of a whole slide scan or an area of interest having (x,y) pixel dimensions (e.g., 1000 pixels by 1000 pixels). For example, consider a whole image split into M columns of tiles and N rows of tiles, where each tile within the M×N mosaic comprises a portion of the whole image, i.e., a tile at location MI,NI comprises a first portion of an image, while a tile at location M3,N4 comprises a second portion of the image, the first and second portions being different. In some embodiments, the tiles may each have the same dimensions (pixel size by pixel size).

As used herein, the term "patch" or "image patch" refers to a container of pixels corresponding to a portion of a tile image, a whole image, or a whole slide. In some embodiments, "patch" or "image patch" refers to a region of a tile image or an area of interest having (x,y) pixel dimensions (e.g., 256 pixels by 256 pixels). For example, a tile image of 1000 pixels by 1000 pixels divided into 100 pixel×100 pixel patches would comprise 100 patches (each patch containing 1000 pixels). In other embodiments, the patches overlap with each "patch" or "image patch" having (x,y) pixel dimensions and sharing one or more pixels with another "patch" or "image patch".

III. Techniques for Automated Non-Tumor Segmentation

Image segmentation is a procedure to separate similar portions of images showing resemblance in different features like shape, size, color, etc. Segmentation of tumors and tumor cells allows visualization of the size, quantity, and position of a tumor or tumor cells within a region of the body (e.g., the brain or lung), and may also provide a basis for analysis of stain uptake in digital images. The gold standard of tumor and tumor cell segmentation has long been manual segmentation, which is time-consuming and labor-intensive, and thus unsuitable for clinical use and large scale research and development efforts. Considerable investigation has been devoted to attempt to fully or partially automate the process of tumor segmentation. For example, image segmentation techniques such as thresholding, region growing, fuzzy clustering, use of the watershed algorithm, etc., have been used for separating abnormal tissues (e.g., tumor masses) from normal tissues, such as white matter (WM), gray matter (GM), and cerebrospinal fluid (CSF) of the brain. Nonetheless, the process of segmentation is still challenging not only due to the diversity of target regions comprising tumors or tumor cells but also due difficulty in distinguishing target regions from non-target regions (e.g., normal tissue or blank slide regions).

Described herein is an end-to-end method incorporating a model that uses a two-dimensional CNN to segment and mask non-target regions (e.g., lymphoid aggregates) from images of specimen slides and an image analysis algorithm analyze target regions (e.g., tumor cells) from the images of the specimen slides. The developed model is computationally light and devised to accommodate the size of whole slide images, extreme imbalance between tumors or tumor cells and healthy tissue and the heterogeneous nature of the input images. The model has comparable performance for non-tumor and tumor segmentation to a conventional algorithm relying on human intervention.

III.A. Example Computing Environment

Figure 2:
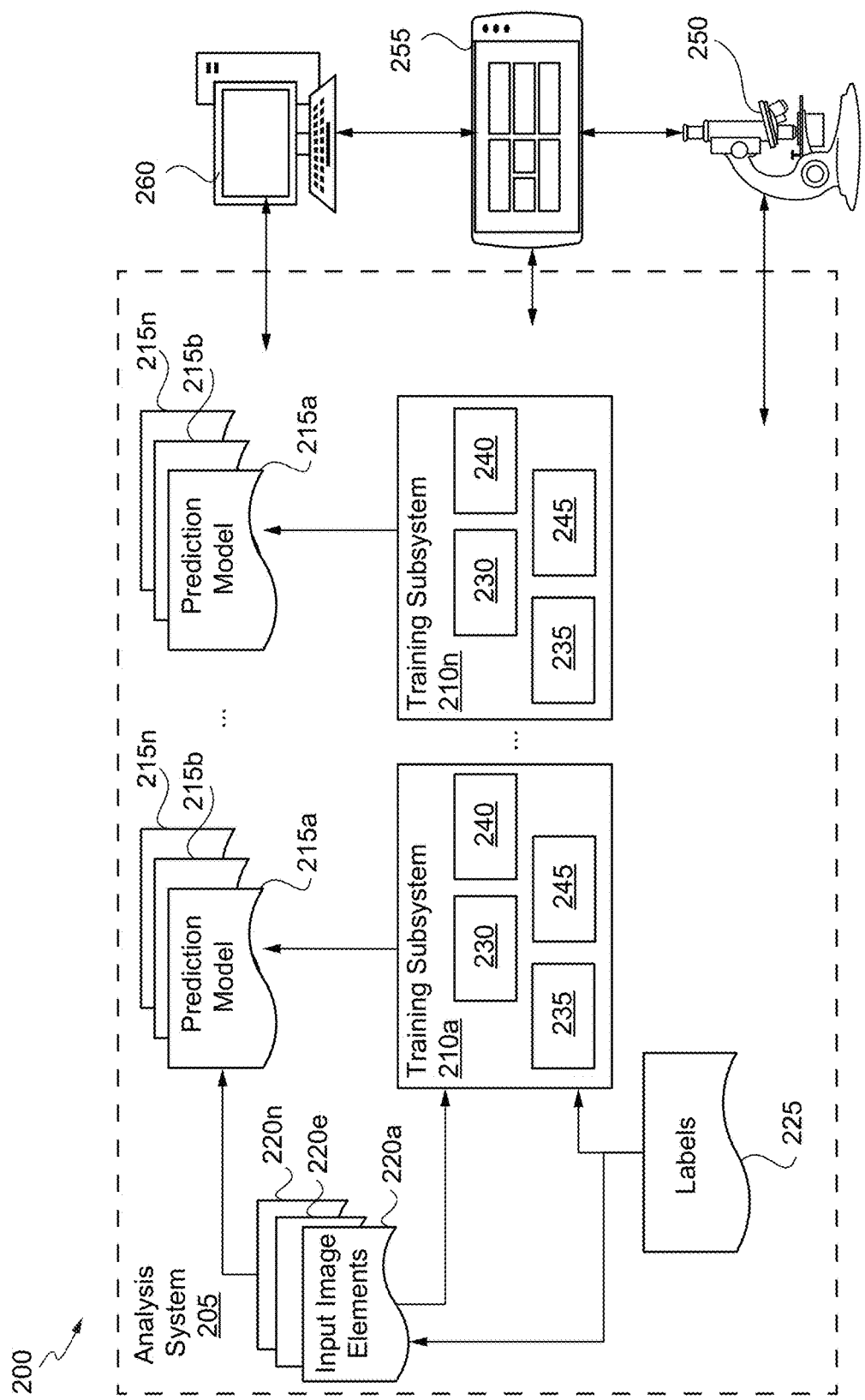
FIG. 2 shows a block diagram illustrating a computing environment for non-tumor segmentation and image analysis using deep convolutional neural networks according to various embodiments.

FIG. 2 shows a block diagram illustrates a computing environment 200 for non-tumor segmentation and image analysis using deep convolutional neural networks according to various embodiments. The computing environment 200 can include an analysis system 205 to train and execute prediction models, e.g., two-dimensional CNN models. More specifically, the analysis system 205 can include training subsystems 210$a$-$n$ ('a' and 'n' represents any natural number) that build and train their respective prediction models 215$a$-$n$ (which may be referred to herein individually as a prediction model 215 or collectively as the prediction models 215) to be used by other components of the computing environment 200. A prediction model 215 can be a machine-learning ("ML") model, such as a deep convolutional neural network (CNN), e.g. an inception neural network, a residual neural network ("Resnet"), or a recurrent neural network, e.g., long short-term memory ("LSTM") models or gated recurrent units ("GRUs") models. A prediction model 215 can also be any other suitable ML model trained to segment non-target regions (e.g., lymphoid aggregate regions), segment target regions, or provide image analysis of target regions, such as a two-dimensional CNN ("2DCNN"), a Mask R-CNN, Feature Pyramid Network (FPN), a dynamic time warping ("DTW") technique, a hidden Markov model ("HMM"), etc., or combinations of one or more of such techniques—e.g., CNN-HMM or MCNN (Multi-Scale Convolutional Neural Network). The computing environment 200 may employ the same type of prediction model or different types of prediction models trained to segment non-target regions, segment target regions, or provide image analysis of target regions. For example, computing environment 200 can include a first prediction model (e.g., a U-Net) for segmenting non-target regions (e.g., lymphoid aggregate regions). The computing environment 200 can also include a second prediction model (e.g., a 2DCNN) for segmenting target regions (e.g., regions of tumor cells). The computing environment 200 can also include a third model (e.g., a CNN) for image analysis of target regions. The computing environment 200 can also include a fourth model (e.g., a HMM) for diagnosis of disease for treatment or a prognosis for a subject such as a patient. Still other types of prediction models may be implemented in other examples according to this disclosure.

In various embodiments, each prediction model 215$a$-$n$ corresponding to the training subsystems 210$a$-$n$ is separately trained based on one or more sets of input image elements 220$a$-$n$. In some embodiments, each of the input image elements 220$a$-$n$ include image data from one or more scanned slides. Each of the input image elements 220$a$-$n$ may correspond to image data from a single specimen and/or a single day on which the underlying image data corresponding to the image was collected. The image data may include an image, as well as any information related to an imaging platform on which the image was generated. For instance, a tissue section may need to be stained by means of application of a staining assay containing one or more different biomarkers associated with chromogenic stains for brightfield imaging or fluorophores for fluorescence imaging. Staining assays can use chromogenic stains for brightfield imaging, organic fluorophores, quantum dots, or organic fluorophores together with quantum dots for fluorescence imaging, or any other combination of stains, biomarkers, and viewing or imaging devices. Moreover, a typical tissue section is processed in an automated staining/assay platform that applies a staining assay to the tissue section, resulting in a stained sample. There are a variety of commercial products on the market suitable for use as the staining/assay platform, one example being the VENTANA SYMPHONY product of the assignee Ventana Medical Systems, Inc. Stained tissue sections may be supplied to an imaging system, for example on a microscope or a whole-slide scanner having a microscope and/or imaging components, one example being the VENTANA iScan Coreo product of the assignee Ventana Medical Systems, Inc. Multiplex tissue slides may be scanned on an equivalent multiplexed slide scanner system. Additional information provided by the imaging system may include any information related to the staining platform, including a concentration of chemicals used in staining, a reaction times for chemicals applied to the tissue in staining, and/or pre-analytic conditions of the tissue, such as a tissue age, a fixation method, a duration, how the section was embedded, cut, etc.

The input image elements 220$a$-$n$ may include one or more training input image elements 220$a$-$d$, validation input image elements 220$e$-$g$, and unlabeled input image elements 220$h$-$n$. It should be appreciated that input image elements 220$a$-$n$ corresponding to the training, validation and unlabeled groups need not be accessed at a same time. For example, an initial set of training and validation input image elements 220$a$-$n$ may first be accessed and used to train a prediction model 215, and unlabeled input image elements may be subsequently accessed or received (e.g., at a single or multiple subsequent times) and used to by a trained prediction model 215 to provide desired output (e.g., segmentation of non-target regions). In some instances, the prediction models 215a-n are trained using supervised training, and each of the training input image elements 220a-d and optionally the validation input image elements 220e-g are associated with one or more labels 225 that identify a "correct" interpretation of non-target regions, target regions, and identification of various biological material and structures within training input image elements 220a-d and the validation input image elements 220e-g. Labels may alternatively or additionally be used to classify a corresponding training input image elements 220a-d and the validation input image elements 220e-g, or pixel therein, with regards to a presence and/or interpretation of a stain associated with a normal or abnormal biological structure (e.g., a tumor cell). In certain instances, labels may alternatively or additionally be used to classify a corresponding training input image elements 220a-d and the validation input image elements 220e-g at a time point corresponding to when the underlying image was/were taken or a subsequent time point (e.g., that is a predefined duration following a time when the image(s) was/were taken).

In some embodiments, the classifier subsystems 210a-n include a feature extractor 230, a parameter data store 235, a classifier 240, and a trainer 245, which are collectively used to train the prediction models 215 based on training data (e.g., the training input image elements 220a-d) and optimizing the parameters of the prediction models 215 during supervised or unsupervised training. In some instances, the training process includes iterative operations to find a set of parameters for the prediction model 215 that minimizes a loss function for the prediction models 215. Each iteration can involve finding a set of parameters for the prediction model 215 so that the value of the loss function using the set of parameters is smaller than the value of the loss function using another set of parameters in a previous iteration. The loss function can be constructed to measure the difference between the outputs predicted using the prediction models 215 and the labels 225 contained in the training data. Once the set of parameters are identified, the prediction model 215 has been trained and can be utilized for segmentation and/or prediction as designed.

In some embodiments, the classifier subsystem 210a-n accesses training data from the training input image elements 220a-d at the input layers. The feature extractor 230 may pre-process the training data to extract relevant features (e.g., edges) detected at particular parts of the training input image elements 220a-d. The classifier 240 can receive the extracted features and transform the features, in accordance with weights associated with a set of hidden layers in one or more prediction models 215, into one or more output metrics that segment non-target or target regions, provide image analysis, provide a diagnosis of disease for treatment or a prognosis for a subject such as a patient, or a combination thereof. The trainer 245 may use training data corresponding to the training input image elements 220a-d to train the feature extractor 230 and/or the classifier 240 by facilitating learning of one or more parameters. For example, the trainer 245 can use a backpropagation technique to facilitate learning of weights associated with a set of hidden layers of the prediction model 215 used by the classifier 240. The backpropagation may use, for example, a stochastic gradient descend (SGD) algorithm to cumulatively update the parameters of the hidden layers. Learned parameters may include, for instance, weights, biases, and/or other hidden layer-related parameters, which can be stored in the parameter data store 235.

Individually or an ensemble of trained prediction models can be deployed to process unlabeled input image elements 220h-n to segment non-target or target regions, provide image analysis, provide a diagnosis of disease for treatment or a prognosis for a subject such as a patient, or a combination thereof. More specifically, a trained version of the feature extractor 230 may generate a feature representation of an unlabeled input image element, which can then be processed by a trained version of the classifier 240. In some embodiments, image features can be extracted from the unlabeled input image elements 220h-n based on one or more convolutional blocks, convolutional layers, residual blocks, or pyramidal layers that leverage dilation of the prediction models 215 in the classifier subsystems 210a-n. The features can be organized in a feature representation, such as a feature vector of the image. The prediction models 215 can be trained to learn the feature types based on classification and subsequent adjustment of parameters in the hidden layers, including a fully connected layer of the prediction models 215.

In some embodiments, the image features extracted by the convolutional blocks, convolutional layers, residual blocks, or pyramidal layers include feature maps that are matrix of values that represent one or more portions of the specimen slide at which one or more image processing operations have been performed (e.g., edge detection, sharpen image resolution). These feature maps may be flattened for processing by a fully connected layer of the prediction models 215, which outputs a non-target region mask, target region mask, or one or more metrics corresponding to a present or future prediction pertaining to a specimen slide. For example, an input image element can be fed to an input layer of a prediction model 215. The input layer can include nodes that correspond with specific pixels. A first hidden layer can include a set of hidden nodes, each of which is connected to multiple input-layer nodes. Nodes in subsequent hidden layers can similarly be configured to receive information corresponding to multiple pixels. Thus, hidden layers can be configured to learn to detect features extending across multiple pixels. Each of one or more hidden layers can include a convolutional block, convolutional layer, residual block, or pyramidal layer. The prediction model 215 can further include one or more fully connected layers (e.g., a softmax layer).

At least part of the training input image elements 220a-d, the validation input image elements 220e-g and/or the unlabeled input image elements 220h-n may include or may have been derived from data obtained directly or indirectly from a source that may be but need not be an element of the analysis system 205. In some embodiments, the computing environment 200 comprises an imaging device 250 that images a sample to obtain the image data, such as a multi-channel image (e.g., a multi-channel fluorescent or brightfield image) with several (such as between ten to sixteen for example) channels. The image device 250 may include, without limitation, a camera (e.g., an analog camera, a digital camera, etc.), optics (e.g., one or more lenses, sensor focus lens groups, microscope objectives, etc.), imaging sensors (e.g., a charge-coupled device (CCD), a complimentary metal-oxide semiconductor (CMOS) image sensor, or the like), photographic film, or the like. In digital embodiments, the image capture device can include a plurality of lenses that cooperate to prove on-the-fly focusing. An image sensor, for example, a CCD sensor can capture a digital image of the specimen. In some embodiments, the imaging device 250 is a brightfield imaging system, a multispectral imaging (MSI) system or a fluorescent microscopy system. The imaging device 250 may utilize nonvisible electromagnetic radiation (UV light, for example) or other imaging techniques to capture the image. For example, the imaging device 250 may comprise a microscope and a camera arranged to capture images magnified by the microscope. The image data received by the image analysis system 205 may be identical to and/or derived from raw image data captured by the imaging device 250.

In some instances, labels 225 associated with the training input image elements 220a-d and/or validation input image elements 220e-g may have been received or may be derived from data received from one or more provider systems 255, each of which may be associated with (for example) a physician, nurse, hospital, pharmacist, etc. associated with a particular subject. The received data may include (for example) one or more medical records corresponding to the particular subject. The medical records may indicate (for example) a professional's diagnosis or characterization that indicates, with respect to a time period corresponding to a time at which one or more input image elements associated with the subject were collected or a subsequent defined time period, whether the subject had a tumor and/or a stage of progression of the subject's tumor (e.g., along a standard scale and/or by identifying a metric, such total metabolic tumor volume (TMTV)). The received data may further include the pixels of the locations of tumors or tumor cells within the one or more input image elements associated with the subject. Thus, the medical records may include or may be used to identify, with respect to each training/validation input image element 220a-g, one or more labels. The medical records may further indicate each of one or more treatments (e.g., medications) that the subject had been taking and time periods during which the subject was receiving the treatment(s). In some instances, images or scans that are input to one or more classifier subsystems are received from the provider system 255. For example, the provider system 255 may receive images from the imaging device 250 and may then transmit the images or scans (e.g., along with a subject identifier and one or more labels) to the analysis system 205.

In some embodiments, data received at or collected at one or more of the imaging devices 250 may be aggregated with data received at or collected at one or more of the provider systems 255. For example, the analysis system 205 may identify corresponding or identical identifiers of a subject and/or time period so as to associate image data received from the imaging device 250 with label data received from the provider system 255. The analysis system 205 may further use metadata or automated image analysis to process data to determine to which classifier subsystem particular data components are to be fed. For example, image data received from the imaging device 250 may correspond to the whole slide or multiple regions of the slide or tissue. Metadata, automated alignments and/or image processing may indicate, for each image, to which region of the slide or tissue the image corresponds. For example, automated alignments and/or image processing may include detecting whether an image has image properties corresponding to a slide substrate or a biological structure and/or shape that is associated with a particular cell such as a white blood cell. Label-related data received from the provider system 255 may be slide-specific, region-specific or subject-specific. When label-related data is slide-specific or region specific, metadata or automated analysis (e.g., using natural language processing or text analysis) can be used to identify to which region particular label-related data corresponds. When label-related data is subject-specific, identical label data (for a given subject) may be fed to each classifier subsystem 210a-n during training.

In some embodiments, the computing environment 200 can further include a user device 260, which can be associated with a user that is requesting and/or coordinating performance of one or more iterations (e.g., with each iteration corresponding to one run of the model and/or one production of the model's output(s)) of the analysis system 205. The user may correspond to a physician, investigator (e.g., associated with a clinical trial), subject, medical professional, etc. Thus, it will be appreciated that, in some instances, the provider system 255 may include and/or serve as the user device 260. Each iteration may be associated with a particular subject (e.g., person), who may (but need not) be different than the user. A request for the iteration may include and/or be accompanied with information about the particular subject (e.g., a name or other identifier of the subject, such as a de-identified patient identifier). A request for the iteration may include an identifier of one or more other systems from which to collect data, such as input image data that corresponds to the subject. In some instances, a communication from the user device 260 includes an identifier of each of a set of particular subjects, in correspondence with a request to perform an iteration for each subject represented in the set.

Upon receiving the request, the analysis system 205 can send a request (e.g., that includes an identifier of the subject) for unlabeled input image elements to the one or more corresponding imaging systems 250 and/or provider systems 255. The trained prediction model(s) 215 can then process the unlabeled input image elements to segment non-target or target regions, provide image analysis, provide a diagnosis of disease for treatment or a prognosis for a subject such as a patient, or a combination thereof. A result for each identified subject may include or may be based on the segmenting and/or one or more output metrics from trained prediction model(s) 215 deployed by the classifier subsystems 110a-n. For example, the segmenting and/or one or more output metrics can include or may be based on output generated by the fully connected layer of one or more CNNs. In some instances, such outputs may be further processed using (for example) a softmax function. Further, the outputs and/or further processed outputs may then be aggregated using an aggregation technique (e.g., random forest aggregation) to generate one or more subject-specific metrics. One or more results (e.g., that include plane-specific outputs and/or one or more subject-specific outputs and/or processed versions thereof) may be transmitted to and/or availed to the user device 260. In some instances, some or all of the communications between the analysis system 205 and the user device 260 occurs via a website. It will be appreciated that the CNN system 205 may gate access to results, data and/or processing resources based on an authorization analysis.

While not explicitly shown, it will be appreciated that the computing environment 200 may further include a developer device associated with a developer. Communications from a developer device may indicate what types of input image elements are to be used for each prediction model 215 in the analysis system 205, a number of neural networks to be used, configurations of each neural network including number of hidden layers and hyperparameters, and how data requests are to be formatted and/or which training data is to be used (e.g., and how to gain access to the training data).

III.B Model Architecture Overview

Figure 3:
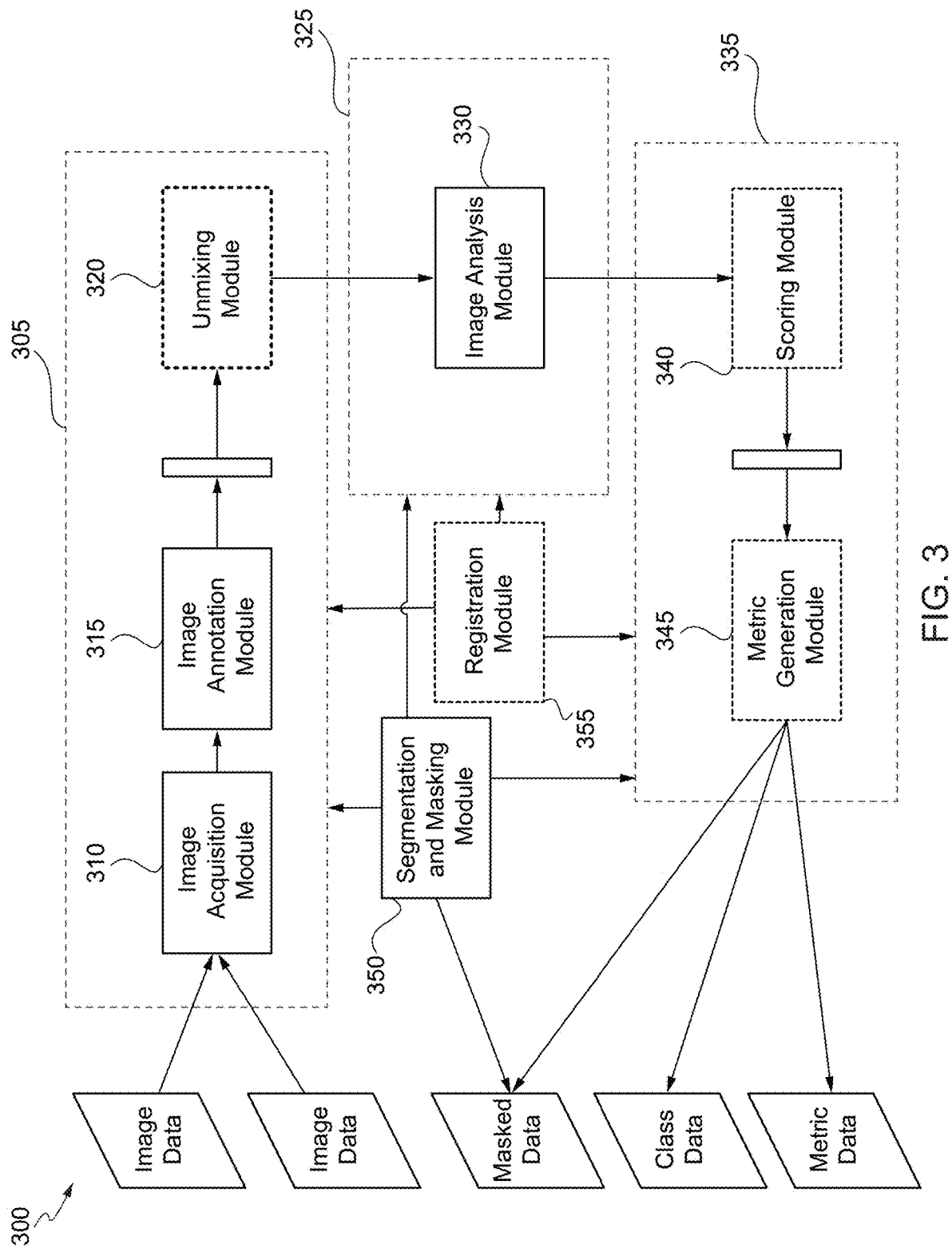
FIG. 3 shows an exemplary schematic diagram 300 representative of a model architecture for non-target region segmentation according to various embodiments.

FIG. 3 illustrates an exemplary schematic diagram 300 representative of a model architecture (e.g., a portion of the analysis system 205 described with respect to FIG. 2) for non-target region segmentation in accordance with various embodiments. The model architecture may comprise a pre-processing stage 305 comprising an image acquisition module 310 to generate or obtain input images including simplex image data (e.g., images where each has a single stain) and/or multiplex image data (e.g., an image having a plurality of stains), an optional image annotation module 315 to electronically annotate a portion of the input images, such as a portion for further analysis, for example, a portion denoting a tumor region or immune cell region, and an optional unmixing module 320 to generate image channel images corresponding to one or more stain channels. The model architecture may further comprise a processing stage 325 comprising an image analysis module 330 to detect and/or classify biological material or structures including cells or nuclei (such as tumor cells, stromal cells, lymphocytes, etc.) based on features within the input images (e.g., within a hematoxylin and eosin stain image, a biomarker image, or an unmixed image channel image).

The model architecture may further comprise a post-processing stage 335 comprising an optional scoring module 340 to derive expression predictions and/or scores for each biomarker in each of the identified regions or biological structures, and an optional metric generation module 345 to derive metrics describing the variability between derived expression predictions and/or scores in different regions or biological structures and optionally provide a diagnosis of disease for treatment or a prognosis for a subject such as a patient. The model architecture may further comprise a segmentation and masking module 350 to segment regions or biological structures such as lymphocyte aggregates or clusters of tumor cells in the input images, and generate a mask based on the segmented regions or biological structures, and an optional registration module 355 to map the identified regions or biological structures (e.g. tumor cells or immune cells) from a first image or first set of images within the input images to at least one additional image or a plurality of additional images. The segmentation and masking module 350 and the optional registration module 355 may be implemented within the pre-processing stage 305, the processing stage 325, the post-processing stage 335, or any combination thereof.

The image acquisition module 310 generates or obtains images or image data of a biological sample having one or more stains (e.g. the images may be simplex images or multiplex images). In some embodiments, the images generated or obtained are RGB images or multispectral images. In some embodiments, the images generated or obtained are stored in a memory device. The images or image data (used interchangeably herein) may be generated or obtained using an imaging device (e.g., the imaging device 250 described with respect to FIG. 2), such as in real-time. In some embodiments, the images are generated or obtained from a microscope or other instrument capable of capturing image data of a specimen-bearing microscope slide, as described herein. In some embodiments, the images are generated or obtained using a 2D scanner, such as one capable of scanning image tiles. Alternatively, the images may be images that have been previously generated (e.g. scanned) and stored in a memory device (or, for that matter, retrieved from a server via a communication network).

The image acquisition module 310 is used to select a portion of the biological sample for which one or more images or for which image data should be acquired. For example, the image acquisition module 310 may receive an identified region of interest or field of view (FOV). In some embodiments, the region of interest is identified by a user of a system of the present disclosure, or another system communicatively coupled to a system of the present disclosure. Alternatively, and in other embodiments, the image acquisition module 305 retrieves a location or identification of a region or interest from a storage/memory device. In some embodiments, the image acquisition module 310 automatically generates a field of view or a region of interest (ROI), for example, via methods described in PCT/EP2015/062015, the contents of which are incorporated herein in their entirety for all purposes. In some embodiments, the ROI is automatically determined by the image acquisition module 305 based on some predetermined criteria or characteristics that are in or of the image (e.g., for a biological sample stained with more than two stains, identifying an area of the image that comprises just two stains). In some instances, the image acquisition module 310 outputs the ROI.

In some embodiments, the image acquisition module 310 generates or obtains at least two images as input. In some embodiments, the images generated or obtained as input are derived from sequential tissue sections, e.g., sequential sections derived from the same tissue sample. In general, the at least two images received as input each comprise signals corresponding to a stain (including chromogens, fluorophores, quantum dots, etc.). In some embodiments, one of the images has been stained with at least one primary stain (hematoxylin or eosin (H&E)), while another one of the images has been stained in at least one of an IHC assay or an in-situ hybridization (ISH) assay for the identification of a specific biomarker. In some embodiments, one of the images has been stained with both hematoxylin and eosin, while another one of the images has been stained in at least one of an IHC assay or ISH assay for the identification of a specific biomarker. In some embodiments, the input images are multiplex images, e.g., stained for multiple, different markers in a multiplex assay according to methods known to those of ordinary skill in the art.

The images generated or obtained may be optionally annotated by a user (e.g., a medical professional such as a pathologist) to image analysis using an image annotation module 315. In some embodiments, the user identifies portions (e.g. sub-regions) of an image suitable for further analysis. The target regions or non-target regions (e.g., tumorous or immune regions) annotated to generate the slide scores may either be whole tissue regions or a specified set of regions on the digital slide. For example, in some embodiments the identified portions are representative of over-expressive tumorous regions of a specific biomarker, e.g. a specific IHC marker. In other embodiments, a user, medical professional, or pathologist may annotate lymphocyte aggregate regions within the digital slide. In some embodiments, annotated representative fields may be selected by a pathologist to reflect the biomarker expression that the pathologist would use for overall slide interpretation. Annotations may be drawn using an annotation tool provided in a viewer application (e.g., VENTANA VIRTUOSO software) and the annotations may be drawn at any magnification or resolution. Alternatively, or in addition, image analysis operations may be used to automatically detect target regions and non-target regions or other regions using automated image-analysis operations such as segmenting, thresholding, edge detection, etc., and field of views (FOVs—an image portion that has a predetermined size and/or shape) automatically generated based on the detected regions.

In some embodiments, the images generated or obtained may be multiplex images, i.e., the image received is of a biological sample stained with more than one stain. In these embodiments, and prior to further processing, each multiplex image is first unmixed into its constituent channels, such as with an unmixing module 320, where each unmixed channel corresponds to a particular stain or signal. In some embodiments, the unmixed images (often referred to as "channel images" or "image channel images") and may be used as the input for each module described herein. For example, the model architecture may be implemented for assessing inter-marker heterogeneity (an indication of the amount of protein expression heterogeneity of a biomarker in a sample) determined with a first H&E image, a second multiplex image stained for a plurality of cluster of differentiation markers (CD3, CD8, etc.), and a plurality of simplex images each stained for a particular biomarker (e.g., ER, PR, Ki67, etc.). In this example, the multiplex image is first unmixed into its constituent channel images, and those channel images may be used along with the H&E image and the plurality of simplex images to determine inter-marker heterogeneity.

Following image acquisition and/or unmixing, input images or unmixed image channel images are processed with an image analysis algorithm provided by the image analysis module 330 to identify and classify cells and/or nuclei. The procedures and algorithms described herein may be adapted to identify and classify various types of cells or cell nuclei based on features within the input images, including identifying and classifying tumor cells, non-tumor cells, stroma cells, lymphocytes, non-target stain, etc. One of ordinary skill in the art should appreciate that the nucleus, cytoplasm and membrane of a cell have different characteristics and that differently stained tissue samples may reveal different biological features. Specifically, one of ordinary skill in the art should appreciate that certain cell surface receptors can have staining patterns localized to the membrane, or localized to the cytoplasm. Thus, a "membrane" staining pattern is analytically distinct from a "cytoplasmic" staining pattern. Likewise, a "cytoplasmic" staining pattern and a "nuclear" staining pattern are analytically distinct. Each of these distinct staining patterns may be used as features for identifying cells and/or nuclei. For example, stromal cells may be strongly stained by FAP, whereas tumor epithelial cells may be strongly stained by EpCAM, while cytokeratins may be stained by panCK. Thus, by utilizing different stains different cell types may be differentiated and distinguished during image analysis to provide a classification solution.

Methods of identifying, classifying, and/or scoring nuclei, cell membranes, and cell cytoplasm in images of biological samples having one or more stains are described in U.S. Pat. No. 7,760,927 ("the '927 Patent"), the contents of which are incorporated herein in their entirety for all purposes. For example, the '927 Patent describes an automated method for simultaneously identifying a plurality of pixels in an input image of a biological tissue stained with a biomarker, including considering a first color plane of a plurality of pixels in a foreground of the input image for simultaneous identification of cell cytoplasm and cell membrane pixels, where the input image has been processed to remove background portions of the input image and to remove counter-stained components of the input image; determining a threshold level between cell cytoplasm and cell membrane pixels in the foreground of the digital image; and determining simultaneously with a selected pixel and its eight neighbors from the foreground if the selected pixel is cell cytoplasm pixel, a cell membrane pixel or a transitional pixel in the digital image using the determined threshold level. In some embodiments, tumor nuclei are automatically identified by first identifying candidate nuclei and then automatically distinguishing between tumor nuclei and non-tumor nuclei. Numerous methods of identifying candidate nuclei in images of tissue are known in the art. For example, automatic candidate nucleus detection can be performed by applying a radial-symmetry-base method, a radial-symmetry-based method of Parvin such as on the Hematoxylin image channel or a biomarker image channel after unmixing (see Parvin, Bahram, et al. "Iterative voting for inference of structural saliency and characterization of subcellular events." Image Processing, IEEE Transactions on 16.3 (2007): 615-623, the contents of which are incorporated herein in their entirety for all purposes).

More specifically, in some embodiments the images obtained as input are processed such as to detect nucleus centers (seeds) and/or to segment the nuclei. For example, instructions may be provided and executed to detect nucleus centers based on radial-symmetry voting using the techniques of Parvin (noted above). In some embodiments, nuclei are detected using radial symmetry to detect centers of nuclei and then the nuclei are classified based on the intensity of stains around the cell centers. In some embodiments, a radial symmetry based nuclei detection operation is used as described in commonly-assigned and co-pending patent application WO2014140085A1, the contents of which are incorporated herein in their entirety for all purposes. For example, an image magnitude may be computed within an image and one or more votes at each pixel are accumulated by adding the summation of the magnitude within a selected region. Mean shift clustering may be used to find the local centers in the region, with the local centers representing actual nuclear locations. Nuclei detection based on radial symmetry voting is executed on color image intensity data and makes explicit use of the a priori domain knowledge that the nuclei are elliptical shaped blobs with varying sizes and eccentricities. To accomplish this, along with color intensities in the input image, image gradient information is also used in radial symmetry voting and combined with an adaptive segmentation process to precisely detect and localize the cell nuclei. A "gradient" as used herein is, for example, the intensity gradient of pixels calculated for a particular pixel by taking into consideration an intensity value gradient of a set of pixels surrounding said particular pixel. Each gradient may have a particular "orientation" relative to a coordinate system whose x- and y-axis are defined by two orthogonal edges of the digital image. For instance, nuclei seed detection involves defining a seed as a point which is assumed to lie inside a cell nucleus and serve as the starting point for localizing the cell nuclei. The first step is to detect seed points associated with each cell nuclei using a highly robust approach based on the radial symmetry to detect elliptical shaped blobs, structures resembling cell nuclei. The radial symmetry approach operates on the gradient image using a kernel based voting procedure. A voting response matrix is created by processing each pixel that accumulates a vote through a voting kernel. The kernel is based on the gradient direction computed at that particular pixel and an expected range of minimum and maximum nucleus size and a voting kernel angle (typically in the range [p/4, p/8]). In the resulting voting space, local maxima locations that have a vote value higher than a predefined threshold value are saved out as seed points. Extraneous seeds may be discarded later during subsequent segmentation or classification processes. Other methods are discussed in US Patent Publication No. 2017/0140246, the disclosure of which is incorporated by reference herein.

After candidate nuclei are identified, the candidate nuclei may be further analyzed to distinguish tumor nuclei from other candidate nuclei. The other candidate nuclei may be further classified (for example, by identifying lymphocyte nuclei and stroma nuclei). In some embodiments, a learnt supervised classifier is applied to identify tumor nuclei, as described further herein. For example, the learnt supervised classifier is trained on nuclei features to identify tumor nuclei and then applied to classify the nucleus candidate in the test image as either a tumor nucleus or a non-tumor nucleus. Optionally, the learnt supervised classifier may be further trained to distinguish between different classes of non-tumor nuclei, such as lymphocyte nuclei and stromal nuclei. In some embodiments, the learnt supervised classifier used to identify tumor nuclei is a random forest classifier. For example, the random forest classifier may be trained by: (i) creating a training set of tumor and non-tumor nuclei, (ii) extracting features for each nucleus, and (iii) training the random forest classifier to distinguish between tumor nuclei and non-tumor nuclei based on the extracted features. The trained random forest classifier may then be applied to classify the nuclei in a test image into tumor nuclei and non-tumor nuclei. Optionally, the random forest classifier may be further trained to distinguish between different classes of non-tumor nuclei, such as lymphocyte nuclei and stromal nuclei.

Nuclei may be identified using other techniques known to those of ordinary skill in the art. For example, an image magnitude may be computed from a particular image channel of one of the FI&E or IHC images, and each pixel around a specified magnitude may be assigned a number of votes that is based on a summation of the magnitude within a region around the pixel. Alternatively, a mean shift clustering operation may be performed to find the local centers within a voting image, which represents the actual location of the nucleus. In other embodiments, nuclear segmentation may be used to segment the entire nucleus based on the now-known centers of the nuclei via morphological operations and local thresholding. In yet other embodiments, model based segmentation may be utilized to detect nuclei (i.e. learning the shape model of the nuclei from a training data set and using that as the prior knowledge to segment the nuclei in the testing image).

In some embodiments, the nuclei are then subsequently segmented using thresholds individually computed for each nucleus. For example, Otsu's method maybe used for segmentation in a region around an identified nucleus since it is believed that the pixel intensity in the nuclear regions varies. As will be appreciated by those of ordinary skill in the art, Otsu's method is used to determine an optimal threshold by minimizing the intra-class variance and is known to those of skill in the art. More specifically, Otsu's method is used to automatically perform clustering-based image thresholding or, the reduction of a gray level image to a binary image. The algorithm assumes that the image contains two classes of pixels following a bi-modal histogram (foreground pixels and background pixels). It then calculates the optimum threshold separating the two classes such that their combined spread (intra-class variance) is minimal, or equivalent (because the sum of pairwise squared distances is constant), so that their inter-class variance is maximal.

In some embodiments, the systems and methods further comprise automatically analyzing spectral and/or shape features of the identified nuclei in an image for identifying nuclei of non-tumor cells. For example, blobs may be identified in the first digital image in a first step. A "blob" as used herein can be, for example, a region of a digital image in which some properties, e.g. the intensity or grey value, are constant or vary within a prescribed range of values. All pixels in a blob can be considered in some sense to be similar to each other. For example, blobs may be identified using differential methods which are based on derivatives of a function of position on the digital image, and methods based on local extrema. A nuclear blob is a blob whose pixels and/or whose outline shape indicate that the blob was probably generated by a nucleus stained with the first stain. For example, the radial symmetry of a blob could be evaluated to determine if the blob should be identified as a nuclear blob or as any other structure, e.g. a staining artifact. For example, in case a blob has a lengthy shape and is not radially symmetric, said blob may not be identified as a nuclear blob but rather as a staining artifact. Depending on the embodiment, a blob identified to be a "nuclear blob" may represent a set of pixels which are identified as candidate nuclei and which may be further analyzed for determining if said nuclear blob represents a nucleus. In some embodiments, any kind of nuclear blob is directly used as an "identified nucleus." In some embodiments, filtering operations are applied on the identified nuclei or nuclear blobs for identifying nuclei which do not belong to biomarker-positive tumor cells and for removing said identified non-tumor nuclei from the list of already identified nuclei or not adding said nuclei to the list of identified nuclei from the beginning. For example, additional spectral and/or shape features of the identified nuclear blob may be analyzed to determine if the nucleus or nuclei ear blob is a nucleus of a tumor cell or not. For example, the nucleus of a lymphocyte is larger than the nucleus of other tissue cell, e.g. of a lung cell. In case the tumor cells are derived from a lung tissue, nuclei of lymphocytes are identified by identifying all nuclear blobs of a minimum size or diameter which is significantly larger than the average size or diameter of a normal lung cell nucleus. The identified nuclear blobs relating to the nuclei of lymphocytes may be removed (i.e., "filtered out from") the set of already identified nuclei. By filtering out the nuclei of non-tumor cells, the accuracy of the method may be increased. Depending on the biomarker, also non-tumor cells may express the biomarker to a certain extent, and may therefore produce an intensity signal in the first digital image which does not stem from a tumor cell. By identifying and filtering out nuclei which do not belong to tumor cells from the totality of the already identified nuclei, the accuracy of identifying biomarker-positive tumor cells may be increased. These and other methods are described in US Patent Publication 2017/0103521, the contents of which are incorporated herein in their entirety for all purposes. In some embodiments, once the seeds are detected, a locally adaptive thresholding method may be used, and blobs around the detected centers are created. In some embodiments, other methods may also be incorporated, such as marker based watershed algorithms can also be used to identify the nuclei blobs around the detected nuclei centers. These and other methods are described in PCT/EP2016/051906, published as WO2016/120442, the contents of which are incorporated herein in their entirety for all purposes.

In some embodiments, a variety of marker expression scores are calculated for each stain or biomarker within each cell cluster within each image (simplex images or unmixed image channel images from a multiplex image) using the scoring module 340. The scoring module 340, in some embodiments, utilizes data acquired during the detection and classification of cells by the image analysis module 330. For example, the image analysis module 330 may comprise a series of image analysis algorithms and may be used to determine a presence of one or more of a nucleus, a cell wall, a tumor cell, or other structures within the identified cell clusters, as described herein. In some embodiments, derived stain intensity values and counts of specific nuclei for each field of view may be used by the scoring module 340 to determine various marker expression scores, such as percent positivity or an H-Score. Methods for scoring are described in further detail in commonly-assigned and co-pending applications WO/2014/102130A1 "Image analysis for breast cancer prognosis" filed Dec. 19, 2013, and WO/2014/140085A1 "Tissue object-based machine learning system for automated scoring of digital whole slides", filed Mar. 12, 2104, the contents of each are hereby incorporated by reference in their entirety herein. For example, automated image analysis algorithms in the image analysis module 330 may be used to interpret each one of the IFIC slides in the series to detect tumor nuclei that are positively and negatively stained for a particular biomarker, such as Ki67, ER, PR, FIER2, etc. Based on the detected positive and negative tumor nuclei, various slide level scores such as marker percent positivity, H-scores, etc. may be computed using the scoring module 340.

In some embodiments, the expression score is an H-score is used to assess the percentage of tumor cells with cell membrane staining graded as 'weak,' 'moderate' or 'strong.' The grades are summated to give an overall maximum score of 300 and a cut-off point of 100 to distinguish between a 'positive' and 'negative. For example, a membrane staining intensity (0, 1+, 2+, or 3+) is determined for each cell in a fixed field of view (or here, each cell in a tumor or cell cluster). The H-score may simply be based on a predominant staining intensity, or more complexly, can include the sum of individual H-scores for each intensity level seen. In other embodiments, the expression score is an Allred score. The Allred score is a scoring system which looks at the percentage of cells that test positive for hormone receptors, along with how well the receptors show up after staining (this is called "intensity"). In other embodiments, the expression score is percent positivity. In the context of scoring a breast cancer sample stained for the PR and Ki-67 biomarkers, for the PR and Ki-67 slides, the percent positivity is calculated (e.g., the total number of nuclei of cells (e.g., malignant cells) that are stained positive in each field of view in the digital image of a slide are summed and divided by the total number of positively and negatively stained nuclei from each of the fields of view of a digital image) in a single slide as follows: Percent positivity=number of positively stained cells/(number of positively stained cells+number of negatively stained cells). In other embodiments, the expression score is an IHC combination score, which is a prognostic score based on a number of IHC markers, where the number of markers is greater than one. IHC4 is one such score based on four measured IHC markers, namely ER, HER2, Ki-67, and PR in a breast cancer sample (for example see Cuzick et al., J. Clin. Oncol. 29:4273-8, 2011, and Barton et al., Br. J. Cancer 1-6, Apr. 24, 2012, both herein incorporated by reference).

Following image analysis and optionally determination of expression scores for each marker in each identified cluster or mapped cluster, metrics may be derived from various identified clusters and biological structures using the metric generation module 345. In some instances, a morphology metric may be computed by applying various image analysis algorithms on pixels contained in or surrounding a nuclear blob or seed. In some embodiments, the morphology metric includes area, minor, and major axis lengths, perimeter, radius, solidity, etc. At the cellular level, such metrics may be used to classify a nucleus as belonging to a healthy or diseased cell. At the tissue level, the statistics of these features over the tissue are exploited in the classification of a tissue as diseased or not. In some instances, an appearance metric may be computed for a particular nucleus by comparing pixel intensity values of pixels contained in or surrounding a nuclear blob or seed used for identifying the nucleus, whereby the compared pixel intensities are derived from different image channels (e.g. a background channel, a channel for the staining of a biomarker, etc.). In some embodiments, the metrics derived from appearance features are computed from percentile values (e.g. the 10th, 50th, and 95th percentile values) of pixel intensities and of gradient magnitudes computed from different image channels. For example, at first, a number P of X-percentile values (X=10, 50, 95) of pixel values of each of a plurality IC of image channels (e.g. three channels: HTX, DAB, luminance) within a nuclear blob representing the nucleus of interest are identified. Computing appearance feature metrics may be advantageous since the derived metrics may describe the properties of the nuclear regions as well as describe the membrane region around the nuclei.

In some instances, a background metric may be computed that is indicative of the appearance and/or stain presence in cytoplasm and cell membrane features of the cell comprising the nucleus for which a background feature was extracted from the image. A background feature and a corresponding metrics can be computed for a nucleus and a corresponding cell depicted in a digital image e.g. by identifying a nuclear blob or seed representing the nucleus; analyzing a pixel area (e.g. a ribbon of 20 pixels—about 9 microns—thickness around the nuclear blob boundary) directly adjacent to the identified set of cells are computed in, therefore capturing appearance and stain presence in cytoplasm and membrane of the cell with this nucleus together with areas directly adjacent to the cell. In some instances, a color metric may be derived from color that includes color ratios, R/(R+G+B) or color principal components. In other embodiments, a color metric derived from color includes local statistics of each of the colors (mean/median/variance/standard deviation) and/or color intensity correlations in a local image window. In some instances, an intensity metric may be derived from groups of adjacent cells with certain specific property values that set up between the dark and the white shades of grey colored cells represented in an image. The correlation of the color feature may define an instance of the size class, thus this way the intensity of these colored cells determines the affected cell from its surrounding cluster of dark cells.

In some instances, other features may be considered and used as the basis for computation of metrics such as texture features or spatial features. By way of another example, the expression scoring may be utilized as a predictive measure or to guide treatment. For example, and in the context of breast cancer and the ER and PR biomarkers, a sample that tests positive may guide the decision to provide hormonal therapy during the course of treatment. The skilled artisan will also appreciate that not all clusters within a biological sample may have the same score for any particular marker. By being able to determine a heterogeneity score or metric describing the variability between clusters, additional guidance may be provided to make an informed treatment decision. In some embodiments, heterogeneity is determined to measure how different clusters compare to each other.

Heterogeneity can be measured by a variability metric describing how, for example, different the protein expression levels among the various identified and mapped clusters compared with each other, as described in WO2019110567A1, the contents of which are incorporated herein in their entirety for all purposes. In some embodiments, heterogeneity is measured between all clusters identified. In other embodiments, heterogeneity is measured between only a subset of identified clusters (e.g. clusters meeting certain predetermined criteria).

In some embodiments, the images received as input may be segmented and masked by the segmentation and masking module 350. For example, a trained convolutional neural network architecture or model may be used to segment non-target regions and/or target regions, which can then be masked for analysis before, during, or after inputting images to an image analysis algorithm. In some embodiments, the input images are masked such that only tissue regions are present in the images. In some embodiments, a tissue region mask is generated to mask non-tissue regions from tissue regions. In some embodiments, a tissue region mask may be created by identifying the tissue regions and excluding the background regions (e.g. regions of a whole slide image corresponding to glass with no sample, such as where there exists only white light from the imaging source).

In some embodiments, a segmentation technique is used to generate tissue region masked images by masking tissue regions from non-tissue regions in the input images. In some embodiments, an image segmentation technique is utilized to distinguish between the digitized tissue data and the slide in the image, the tissue corresponding to the foreground and the slide corresponding to the background. In some embodiments, the segmentation and masking module 350 computes the Area of Interest (AOI) in a whole slide image in order to detect all tissue regions in the AOI while limiting the amount of background non-tissue area that is analyzed. A wide range of image segmentation techniques (e.g., HSV color-based image segmentation, Lab image segmentation, mean-shift color image segmentation, region growing, level set methods, fast marching methods, etc.) can be used to determine, for example, boundaries of the tissue data and non-tissue or background data. Based at least in part on the segmentation, the segmentation and masking module 350 can generate a tissue foreground mask that can be used to identify those portions of the digitized slide data that correspond to the tissue data. Alternatively, the component can generate a background mask used to identify those portions of the digitized slide date that do not correspond to the tissue data.

This identification may be enabled by image analysis operations such as edge detection, etc. A tissue region mask may be used to remove the non-tissue background noise in the image, for example the non-tissue regions. In some embodiments, the generation of the tissue region mask comprises one or more of the following operations (but not limited to the following operations): computing the luminance of the low resolution input image, producing a luminance image, applying a standard deviation filter to the luminance image, producing a filtered luminance image, and applying a threshold to filtered luminance image, such that pixels with a luminance above a given threshold are set to one, and pixels below the threshold are set to zero, producing the tissue region mask. Additional information and examples relating to the generation of tissue region masks is disclosed in PCT/EP/2015/062015, entitled "An Image Processing Method and System for Analyzing a Multi-Channel Image Obtained from a Biological Tissue Sample Being Stained by Multiple Stains," the contents of which are incorporated herein in their entirety for all purposes.

In addition to masking non-tissue regions from tissue regions, the segmentation and masking module 350 may also mask other areas of interest as needed, such as a portion of a tissue identified as belonging to a non-target region or a certain tissue type (e.g., lymphoid aggregate regions) or a portion of a tissue identified as belonging to a target region or a certain tissue type (e.g., a suspected tumor region). In various embodiments, non-target region segmentation such as lymphocyte aggregate region segmentation is performed by a CNN model (e.g., a CNN model associated with classifier subsystem 210a as described with respect to FIG. 2). In some embodiments, the CNN model is a two-dimensional segmentation model. For example, the CNN model may be a U-Net with residual blocks, dilation, and depth-wise convolutions. The pre-processed or processed image data (e.g., two-dimensional regional or whole slide images) may be used as input into the U-Net. The U-Net comprises a contracting path supplemented with an expansive path, where the pooling operations of successive layers in the expansive path are replaced with upsampling operators. Thus, these successive layers increase the resolution of the output from the previous layers and enable the final output of the U-Net to have the same resolution as the input image. Based at least in part on the segmentation, the U-Net can generate a non-target region foreground mask that can be used to identify those portions of the digitized slide data that correspond to the non-target region data. Alternatively, the component can generate a background mask used to identify those portions of the digitized slide data that do not correspond to the non-target region data. The outputs of the U-Net may be the foreground non-target region mask representing the locations of non-target regions present in the underlying images or the background non-target region mask representing those portions of the digitized slide data that do not correspond to the non-target region data (e.g., target regions).

In some embodiments, biological material or structures such as tumor cells or cell clusters identified in one or more images are mapped to one or more additional images using the registration module 355 and a registration process. Registration is the process of transforming different sets of data, here images, or cell cluster within images, into one coordinate system. More specifically, registration is the process of aligning two or more images and, in general, involves designating one image as the reference (also called the reference image or the fixed image), and applying geometric transformations to the other images so that they align with the reference. A geometric transformation maps locations in one image to new locations in another image. The step of determining the correct geometric transformation parameters is key to the image registration process. In some embodiments, the image registration is performed using the methods described in WO/2015/049233, entitled "Line-Based Image Registration and Cross-Image Annotation Devices, Systems and Methods," filed on Sep. 30, 2014, the contents of which are incorporated herein in their entirety for all purposes. WO/2015/049233 describes a registration process comprising a coarse registration process used alone or in combination with a fine registration process. In some embodiments, the coarse registration process may involve selecting digital images for alignment, generating a foreground image mask from each of the selected digital images, and matching tissue structure between the resultant foreground images. In further embodiments, generating a foreground image mask involves generating a soft-weighted foreground image from the whole slide image of a stained tissue section and applying OTSU thresholding to the soft-weighted foreground image to produce a binary soft-weighted image mask. In other further embodiments, generating a foreground image mask involves generating a binary soft-weighted image mask from a whole slide image of a stained tissue section, separately generating a gradient magnitude image mask from the same whole slide image, applying OTSU thresholding to the gradient image mask to produce a binary gradient magnitude image mask, and combining the binary soft-weighted image and the binary gradient magnitude image mask using a binary OR operation to generate the foreground image mask. A "gradient" as used herein is, for example, the intensity gradient of pixels calculated for a particular pixel by taking into consideration an intensity value gradient of a set of pixels surrounding said particular pixel. Each gradient may have a particular "orientation" relative to a coordinate system whose x- and y-axis are defined by two orthogonal edges of the digital image. A "gradient orientation feature" may be a data value that indicates the orientation of the gradient within said coordinate system.

In some embodiments, matching tissue structure involves computing line-based features from the boundary of each of the resultant foreground image masks, computing global transformation parameters between a first set of line-features on a first foreground image mask and a second set of line-features on a second foreground image mask, and globally aligning the first and second image based on the transformation parameters. In yet further embodiments, the coarse registration process includes mapping the selected digital images based on the global transformation parameters to a common grid, which grid may encompass the selected digital images. In some embodiments, the fine registration process may involve identifying a first sub-region of a first digital image in the set of aligned digital images; identifying a second sub-region on a second digital image in the set of aligned digital images, where the second sub-region is larger than the first sub-region and the first sub-region is located substantially within the second sub-region on common grid; and, computing an optimized location for the first sub-region in the second sub-region.

III.C. Exemplary U-Net for Two-Dimensional Segmentation

Figure 4:
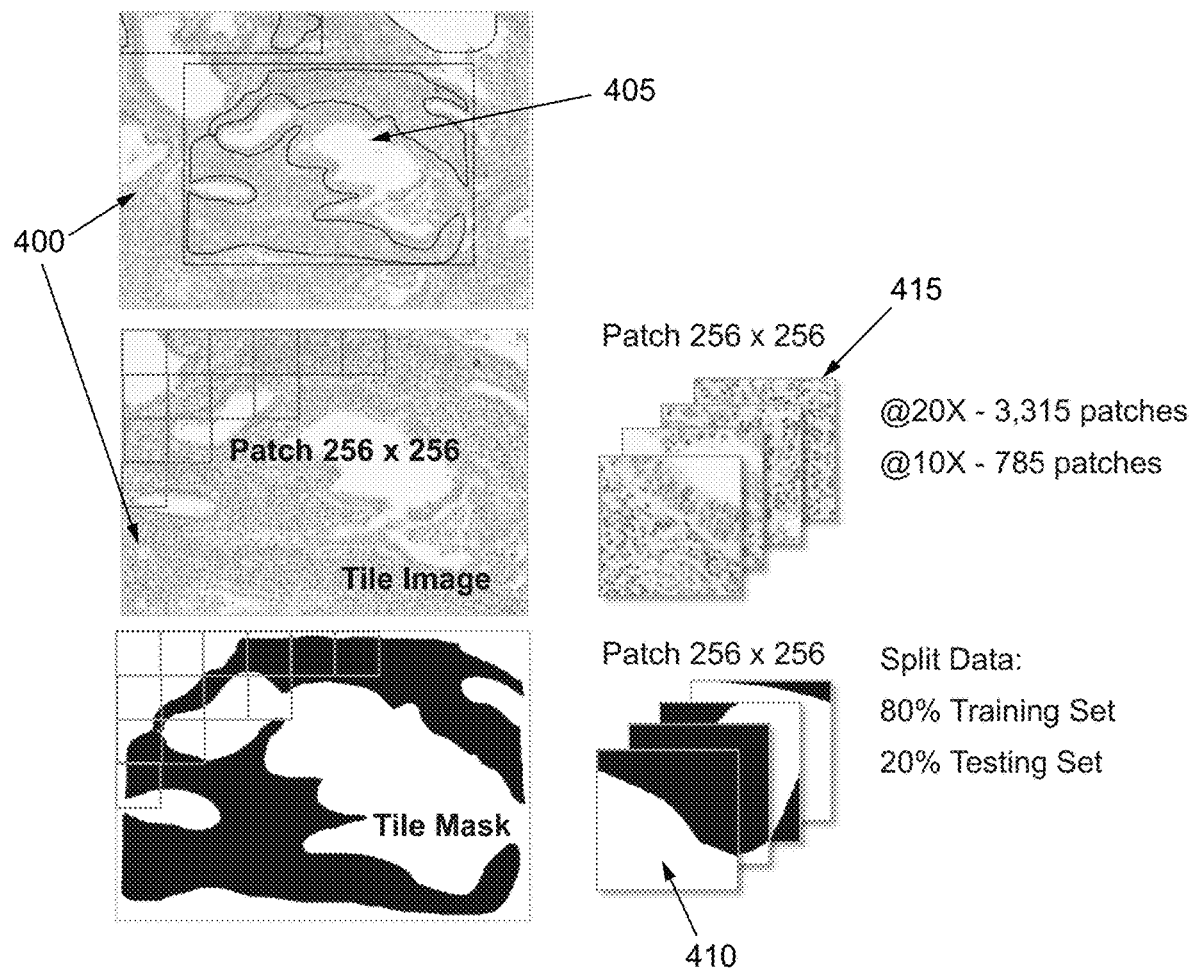
FIG. 4 shows ground truth generation and prediction model training according to various embodiments.
Figure 5A:
FIG. 5A shows loss during the modified U-Net training with respect to the batches according to various embodiments.
Figure 5B:
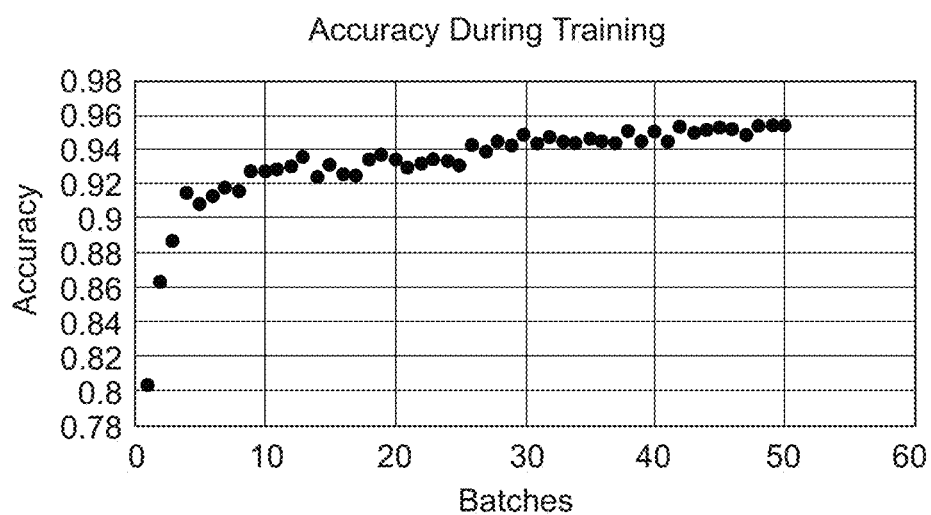
FIG. 5B shows accuracy during the modified U-Net training to achieve optimal performance according to various embodiments.

The two-dimensional segmentation extracts features from input images (e.g., one or more images of the specimen slide) individually using a tile based method with a modified U-Net to generate two-dimensional non-target region maps with high resolution. As shown in FIG. 4, tile images 400 (e.g., IHC images) may be used in training the modified U-Net with manual annotations 405 to identify non-target regions (e.g., lymphoid aggregates) and target regions (e.g., tumor and other cells). For example, the modified U-Net may be trained using ground truth segmentation masks 410 and the output is foreground/background probability per pixel where the loss function is constructed to measure the difference between the foreground/background probability per pixel predicted using the U-Net and the ground truth segmentation masks 410. The ground truth segmentation masks 410 may be generated from the tile images 400 with manual annotations 405 on tile images 400. A tile image 400 may be segmented into relatively small patches 415 of a predetermined size such as s size of 256×256 for both the original black and white or color images to generate corresponding ground truth segmentation masks 410. The pair of small patches 415 of black and white or color images or corresponding ground truth segmentation masks 410 are input to the modified U-Net. In certain instances, the data may be split to 80% of training set and 20% of testing set or validation set. In some instances, a learning rate schedule is used to adjust the learning rate of the modified U-Net during training by reducing the learning rate according to a pre-defined schedule. In certain instances, the learning rate schedule is a step decay schedule that drops the learning rate by a predetermined factor every few epochs for optimizing the loss function. For example, a step decay schedule may be used to drop the learning rate by a quarter every 15 epochs. In certain instances, a binary cross entropy loss function is used to train the modified U-Net using hyperparameters set at: 50 epochs, a batch size of 2, and a learning rate of $1 \times 10^{-5}$. The training may be performed using two different magnifications, for example at 20× and 10×, in order to find the optimal modified U-Net. FIG. 5A shows the loss during the modified U-Net training with respect to the batches. FIG. 5B shows the accuracy during the modified U-Net training to achieve optimal performance.

Figure 6:
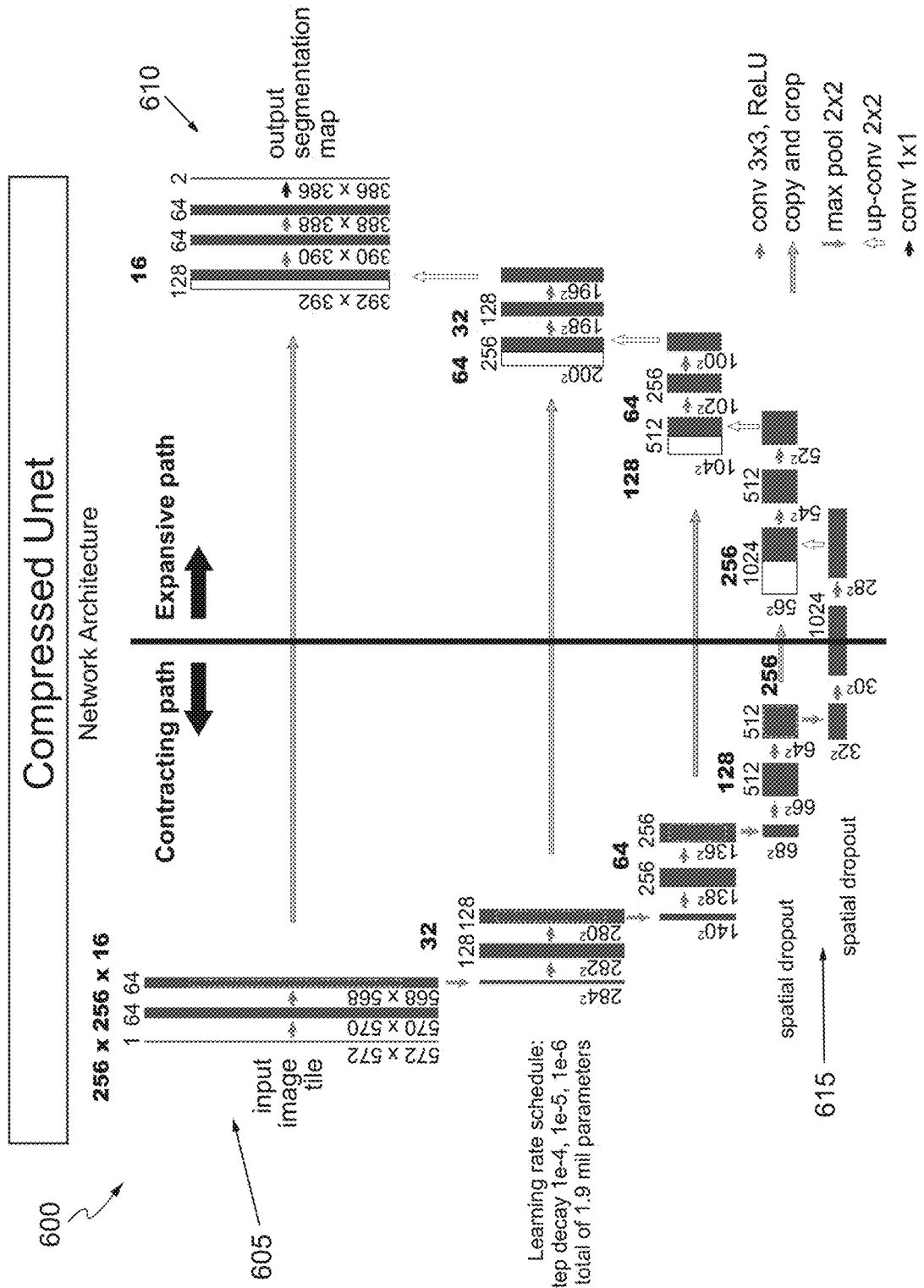
FIG. 6 shows an exemplary U-Net according to various embodiments.

As shown in FIG. 6, a U-Net 600 may include a contracting path 605 (encoder) and an expansive path 610 (decoder), which gives it a u-shaped architecture. The contracting path 605 is a CNN network that includes repeated application of convolutions (e.g., 3×3 convolutions (unpadded convolutions)), each followed by a rectified linear unit (ReLU) and a max pooling operation (e.g., a 2×2 max pooling with stride 2) for downsampling. At each downsampling step or pooling operation, the number of feature channels may be doubled. During the contraction, the spatial information of the image data is reduced while feature information is increased. The expansive path 610 is a CNN network that combines the feature and spatial information from the contracting path 605 (upsampling of the feature map from the contracting path 605). The upsampling of the feature map is followed by a sequence of up-convolutions (upsampling operators) that halves the number of channels, concatenations with a correspondingly cropped feature map from the contracting path 605, repeated application of convolutions (e.g., two 3×3 convolutions) that are each followed by a rectified linear unit (ReLU), and a final convolution (e.g., one 1×1 convolution) to generate the two-dimensional non-target region masks. In order to localize, the high-resolution features from the contracting path 605 are combined with the upsampled output from the expansive path 610.

In various embodiments, the U-Net 600 implements a number of channels that is reduced overall from that of a conventional U-Net architecture. Specifically, the number of channels of the intermediate activation output layers is reduced by a predetermined factor such as two or four (see e.g., the bold numbers within the contracting path 605 and the expansive path 610), for example, in the second layer, the number of channels is reduced by a factor of four from 64 to 16, etc., and the max number of channels is also reduced by a factor of four to 256 instead of 1024 as used in a conventional U-Net architecture. This reduction in channels is implemented to reduce the computation expense and model complexity. Empirical evidence shows that that this compressed U-Net architecture provides better results as compared to a conventional U-Net architecture having a max number of 1024 channels and no reduction in the number of channels. Moreover, the U-Net 600 comprises a spatial drop out 615 to combat overfitting. The spatial drop out 615 may be implemented in the last few layers (i.e., the last one, two, three, or four layers) of the contracting path 605. The spatial drop out 615 drops entire two-dimensional feature maps instead of individual elements as performed by conventional drop out. For example, if adjacent pixels within feature maps are strongly correlated (as is normally the case in early convolution layers) then conventional dropout will not regularize the activations and will otherwise result in an effective learning rate decrease. In contrast, the spatial drop out 615 will regularize the activations and help promote independence between feature maps and will otherwise result in an effective learning rate increase.

III.D Techniques for Segmentation and Analysis

Figure 7:
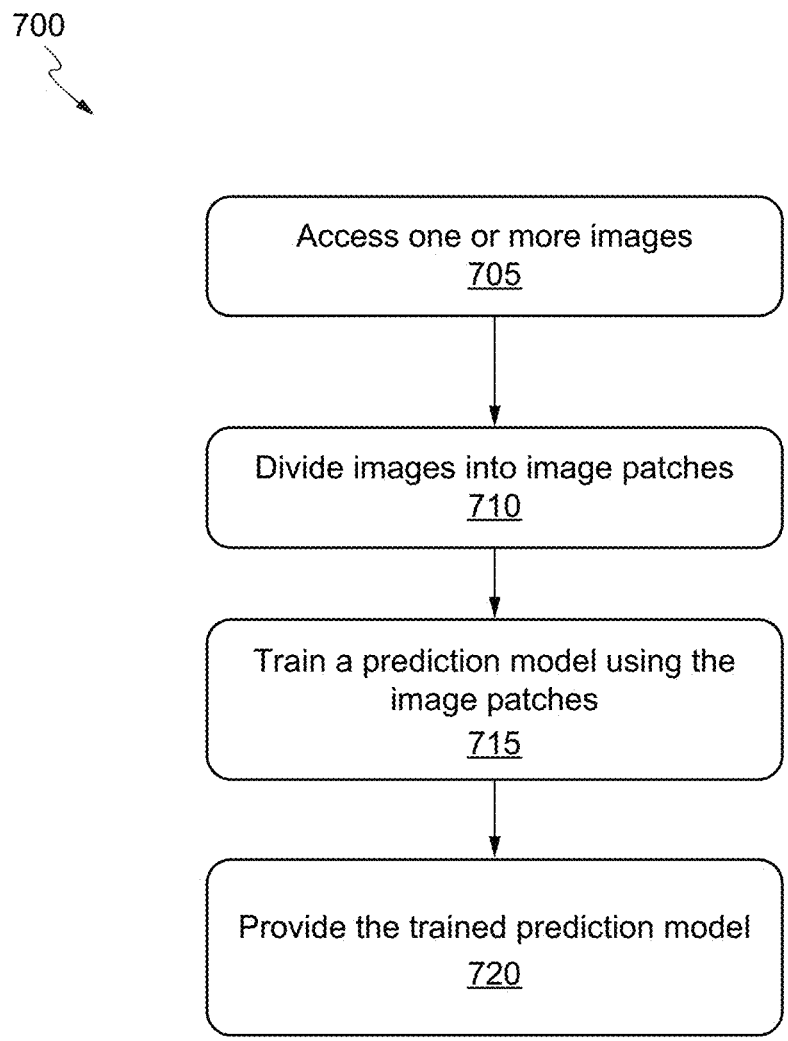
FIG. 7 shows a process for training a prediction model according to various embodiments.

FIG. 7 shows a process 700 for training a prediction model in accordance with various embodiments.

Process 700 begins at block 705, at which a plurality tile images for a specimen are accessed. One or more tile images of the plurality tile images comprise annotations to segment non-target regions and target regions of the one or more tile images. At block 710, the one or more tile images are divided into image patches of a predetermined size. For example, tile images typically have random sizes and a two-dimensional segmentation model such as a U-Net learns better on a normalized image size, and thus the tile images may be divided into image patches with a specific size to optimize training. In some embodiments, the one or more tile images are split into image patches having a predetermined size of 64 pixels×64 pixels, 128 pixels×128 pixels, 256 pixels×256 pixels, or 512 pixels×512 pixels. At block 715, a prediction model such as a two-dimensional segmentation model is trained on the image patches. In some instances, the two-dimensional segmentation model is a modified U-Net model comprising contracting path and an expansive path, each of the contracting path and the expansive path having a maximum predetermined number of channels, and one or more layers of the contracting path implement spatial drop out. In some embodiments, the maximum predetermined number of channels is 64, 128, 256, or 512. The training may comprise performing iterative operations to find a set of parameters for the prediction model that minimizes a loss function for the prediction model. Each iteration may involve finding the set of parameters for the prediction model so that a value of the loss function using the set of parameters is smaller than a value of the loss function using another set of parameters in a previous iteration. The loss function is constructed to measure a difference between outputs predicted using the prediction model and the annotations contained in the one or more tile images or image patches. In some instances, the training further comprises adjusting a learning rate of the modified U-Net by reducing the learning rate according to a predefined schedule. The predefined schedule may be a step decay schedule that drops the learning rate by a predetermined factor every predetermined number of epochs for optimizing the loss function. In certain instances, the loss function is a binary cross entropy loss function. At block 720, the trained prediction model is provided. For example, the trained prediction model may be deployed for execution in an image analysis environment, as described with respect to FIGS. 2 and 3.

Figure 8A:
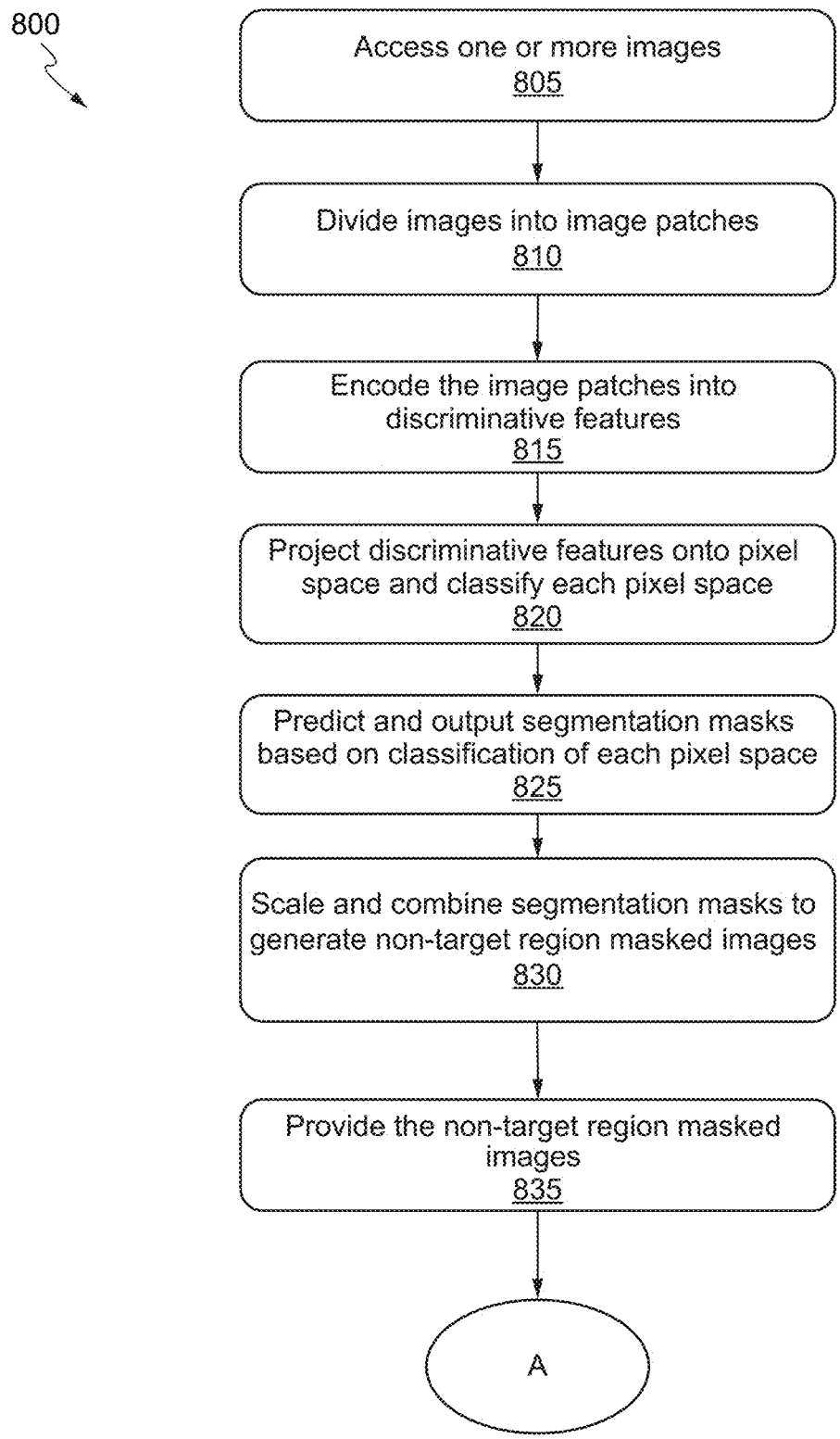
FIG. 8A shows a process for generating a segmentation mask for a non-target region in image data according to various embodiments.

FIG. 8A shows a process 800 for generating a segmentation mask for a non-target region in image data in accordance with various embodiments.

Figure 8B:
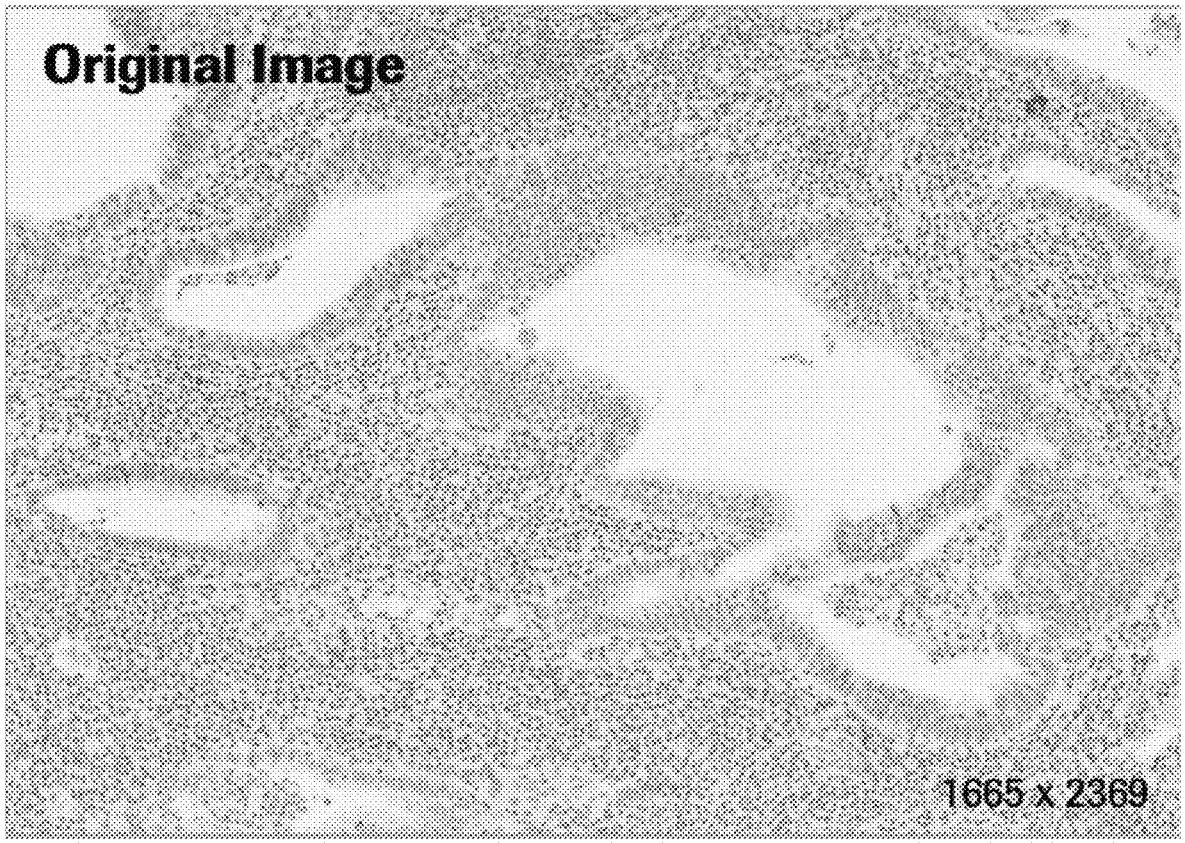
FIG. 8B shows an example of an original image according to various embodiments.

Process 800 begins at block 805, at which a plurality of images for a specimen are accessed. One or more images of the plurality of images comprise a non-target region and a target region. FIG. 8B shows an example of an original image of the one or more images. In some instances, the specimen is stained for one or more biomarkers. At block 810, the one or more images (e.g., tile images) are divided into image patches of a predetermined size. In some embodiments, the one or more tile images are split into image patches having a predetermined size of 64 pixels×64 pixels, 128 pixels×128 pixels, 256 pixels×256 pixels, or 512 pixels×512 pixels. At block 815, the image patches are encoded into discriminative features. The discriminative features (e.g., lower resolution features) may be associated with a biological material or structure, for example a lymphoid aggregate or group of immune cells, that is at least part of the non-target region. The encoding may be performed by a prediction model such as a two-dimensional segmentation model. In some instances, the two-dimensional segmentation model is a modified U-Net model comprising a contracting path and an expansive path, each of the contracting path and the expansive path having a maximum of 256 channels, and one or more layers of the contracting path implement spatial drop out. The contracting path may perform the encoding of the image patches into the discriminate features at multiple different levels.

At block 820, the discriminative features are projected onto a pixel space (e.g., a higher resolution) and a classification of the biological material or structure is determined for each pixel space. The projecting and determining the classification may be performed by the prediction model such as the two-dimensional segmentation model. In some instances, the two-dimensional segmentation model is the modified U-Net model. The expansive path may perform the projecting of the discriminative features and the determination of the classification at multiple different levels. In certain instances, the multiple different levels perform upsampling (i.e., expand the feature dimensions to the original size of the input image patches) and concatenation followed by regular convolution operations to project the discriminative features and determine the classification. In some instances, the discriminative features are semantically projected to assign a class to every single pixel (dense prediction) in an image patch and determine the classification of the biological material or structure as a single instance. The classification of each pixel in an image patch may be determined based on a predetermined threshold, and in some instances, the predetermined threshold is a hyperparameter that is optimized in the training of the prediction model.

At block 825, segmentation maps for the non-target region are predicted and output based on the classification of the biological material or structure. The segmentation maps are output as a high resolution image patch in which all the pixels are classified (e.g., presence or absence of the biological material or structure). In some embodiments, the segmentation maps are output at a size of 256 pixels×256 pixels with each pixel having a classification in range from 0 to 1, where 0 represents no biological material or structure and 1 represents presence of the biological material or structure. The generating may be performed by the prediction model such as the two-dimensional segmentation model. In some instances, the two-dimensional segmentation model is the modified U-Net model.

Figure 8C:
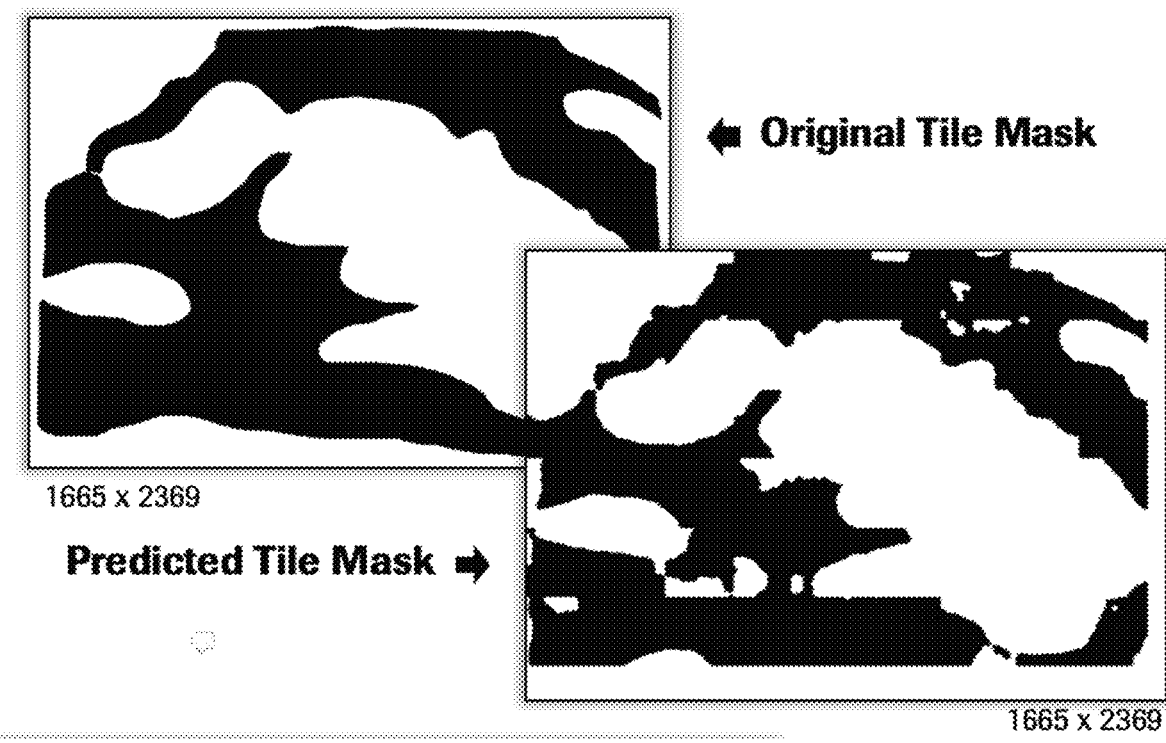
FIG. 8C shows an example of a predicted tile mask according to various embodiments.

At block 830, the segmentations maps for the non-target region are scaled up and combined to generate non-target region masked images that provide a segmentation mask for the non-target region of the one or more images that contains the biological material or structure. For example, the 256× 256 patch images comprising segmentations maps for the non-target region may be stitched together to create a tile mask image that provide a segmentation mask for the non-target region (see, e.g., FIG. 8C, which shows a predicted tile mask image compared to a groundtruth tile mask image). In some instances, the non-target region masked images exclude the non-target region from the one or more images such that the non-target regions may be excluded from downstream processing (e.g., image analysis as discussed with respect to FIG. 9). At block, 835, the non-target region masked images are provided. For example, the non-target region masked images may be provided to a memory storage device, provided to a display of a computing device, provided to a user in one or more type of medium such as user interface, etc.

Figure 9A:
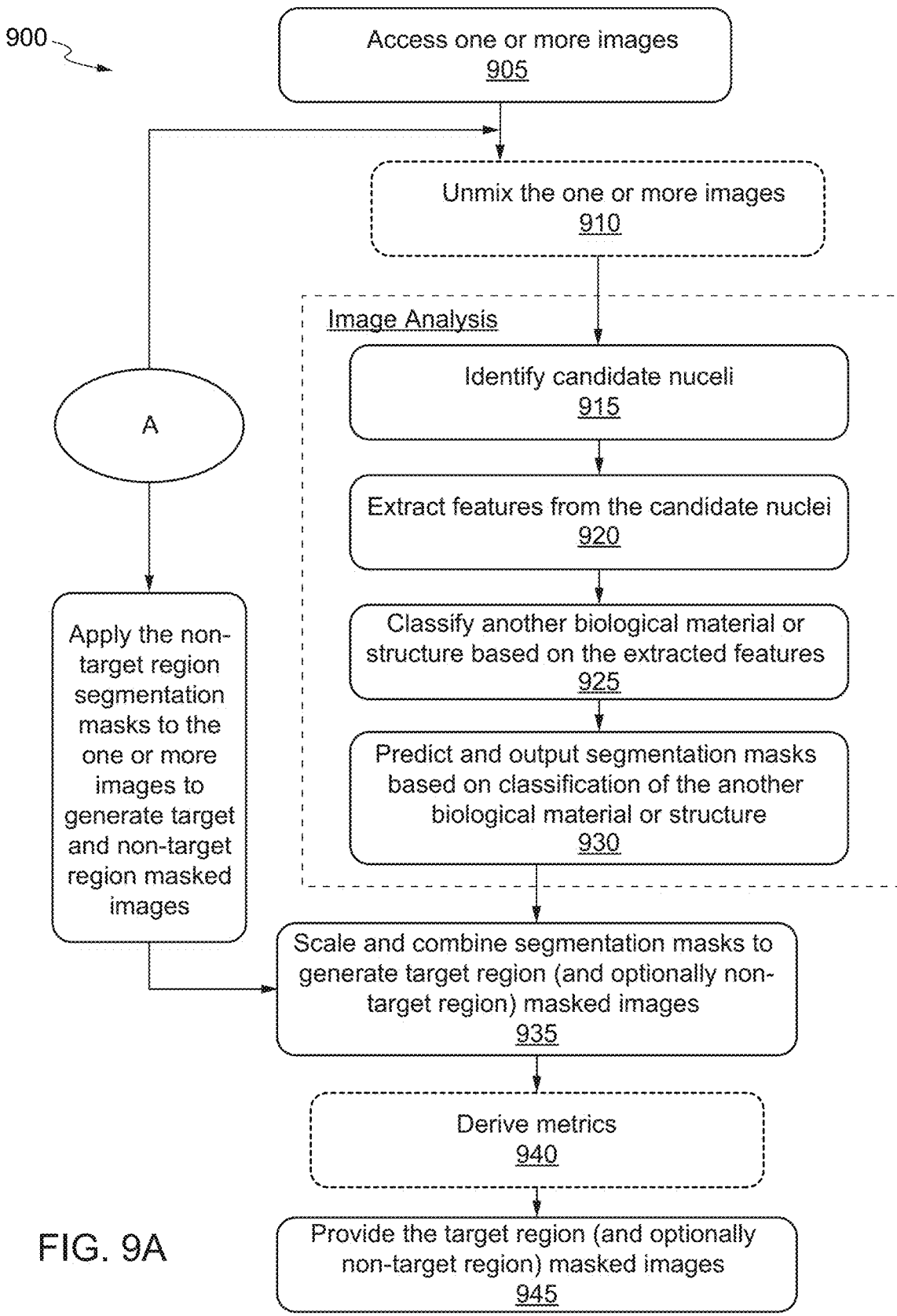
FIG. 9A shows a process for applying a segmentation mask to support or improve image analysis according to various embodiments.

FIG. 9A shows a process 900 for applying a segmentation mask to support or improve image analysis in accordance with various embodiments.

Process 900 begins at block 905, at which a plurality images for a specimen are accessed. One or more images of the plurality images comprise a non-target region and a target region, see, e.g., FIG. 8B. In some instances, the specimen is stained for one or more biomarkers. In some embodiments, the images accessed are RGB images or multispectral images. In some embodiments, the images accessed are stored in a memory device. The images may be generated or obtained using an imaging device (e.g., the imaging device 250 described with respect to FIG. 2), such as in real-time. In some embodiments, the images are accessed from a microscope or other instrument capable of capturing image data of a specimen-bearing microscope slide, as described herein. In some embodiments, the images are accessed from a 2D scanner, such as one capable of scanning image tiles. Alternatively, the images may be images that have been previously generated (e.g. scanned) and stored in a memory device (or, for that matter, retrieved from a server via a communication network). In some instances, the images are non-target region masked images that provide a segmentation mask for the non-target region that contains a biological material or structure such as lymphoid aggregate or groups of immune cells. The non-target region masked images may be generated and/or obtained for access, as described with respect to FIG. 8A.

In some embodiments, the images accessed are multiplex images, i.e., the image received is of a biological sample stained with more than one stain. In these embodiments at block 910, and prior to further processing, each multiplex image is unmixed into its constituent channels, where each unmixed channel corresponds to a particular stain or signal. Following image acquisition and/or unmixing, the images or unmixed image channel images are processed with an image analysis algorithm in blocks 915-945 to identify and classify cells and/or nuclei. The processes and analysis algorithm described herein may be adapted to identify and classify various types of cells or cell nuclei based on features within the input images, including identifying and classifying tumor cells, non-tumor cells, stroma cells, lymphocytes, non-target stain, etc.

At block 915, candidate nuclei are identified. In some embodiments, the images are input into image analysis to detect nucleus centers (seeds) and/or to segment the nuclei. For example, a plurality of pixels in the images stained with a biomarker may be identified, including considering a one or more color planes of a plurality of pixels in a foreground of the input image for simultaneous identification of cell cytoplasm and cell membrane pixels. In some instances, the images are pre-processed to remove portions of the images that are not to be analyzed or are not determined to be target regions, for example, the slide background, the non-target regions as described with respect to FIG. 8), and/or counterstained components of the images. Thereafter, a threshold level between cell cytoplasm and cell membrane pixels in the foreground of the digital image is determined, and a selected pixel and its predetermined number of pixel neighbors from the foreground are processed to determine whether the selected pixel is cell cytoplasm pixel, a cell membrane pixel or a transitional pixel in the digital image based on the determined threshold level. In some embodiments, tumor nuclei are automatically identified by applying a radial-symmetry-base method, a radial-symmetry-based method of Parvin such as on the Hematoxylin image channel or a biomarker image channel after the unmixing.

At block 920, features are extracted from the candidate nuclei. At least some of the features may be associated with another biological material or structure within a target region such as a tumor cell or cluster of tumor cells. The extraction may be performed by an image analysis prediction model such as a Mask R-CNN capable of semantic or instance segmentation. For example, after candidate nuclei are identified, the candidate nuclei may be further analyzed by the image analysis prediction model to distinguish tumor nuclei from other candidate nuclei (e.g., lymphocyte nuclei). In certain instances, the other candidate nuclei may be further processes to identify specific classes of nuclei and/or cells, e.g., identify lymphocyte nuclei and stroma nuclei. At block 925, another biological material or structure within the target region is classified as a type of cell or cell nuclei based on the features extracted from the candidate nuclei. The classification may be performed by the image analysis prediction model. In some embodiments, a learnt supervised classifier is applied to identify tumor nuclei from the candidate nuclei. For example, the learnt supervised classifier may be trained on nuclei features to identify tumor nuclei and then applied to classify the nucleus candidate in the test image as either a tumor nucleus or a non-tumor nucleus. Optionally, the learnt supervised classifier may be further trained to distinguish between different classes of non-tumor nuclei, such as lymphocyte nuclei and stromal nuclei. In some embodiments, the learnt supervised classifier used to identify tumor nuclei is a random forest classifier. For example, the random forest classifier may be trained by: (i) creating a training set of tumor and non-tumor nuclei, (ii) extracting features for each nucleus, and (iii) training the random forest classifier to distinguish between tumor nuclei and non-tumor nuclei based on the extracted features. The trained random forest classifier may then be applied to classify the nuclei in a test image into tumor nuclei and non-tumor nuclei. Optionally, the random forest classifier may be further trained to distinguish between different classes of non-tumor nuclei, such as lymphocyte nuclei and stromal nuclei.

At block 930, segmentation maps for the target region are predicted and output based on the classification of another biological material or structure. The segmentation maps may be output by the image analysis prediction model. At block 935, the segmentations maps for the target region are scaled up and combined to generate target region masked images that provide a segmentation mask for the target region of the one or more images that contains another biological material or structure. In other instances, the segmentations maps for the target region and the segmentation maps for the non-target regions (obtained from the processes as described with respect to FIG. 8A) are scaled up and combined to generate target region and non-target region masked images that provide a segmentation mask for the target region that contains another biological material or structure (e.g., the tumor cells) and a segmentation mask for the non-target region that contains the biological material or structure (e.g., the lymphoid aggregates or group of immune cells). In this manner, it is possible for an observer (human user or computing device) to differentiate between target regions and non-target regions.

Figure 9B:
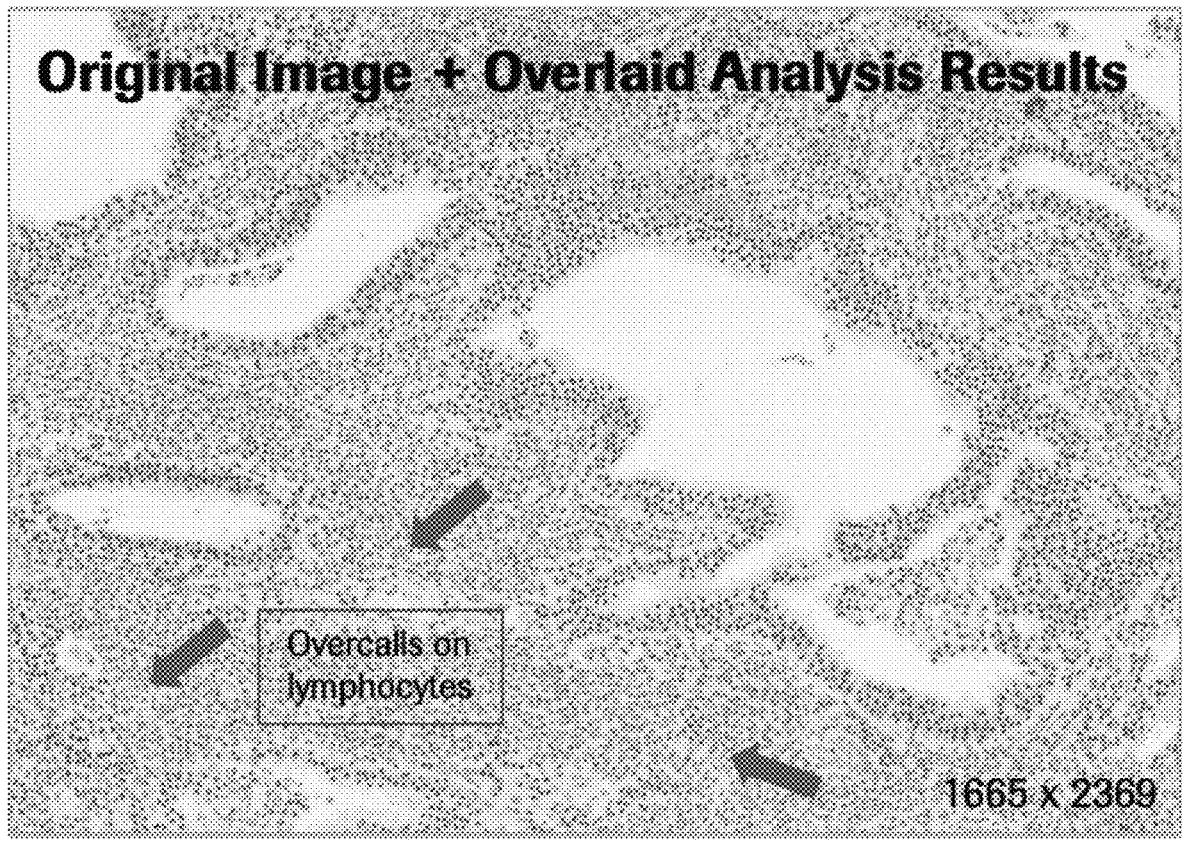
FIG. 9B shows an example of an original image with an overlaid analysis result according to various embodiments.
Figure 9C:
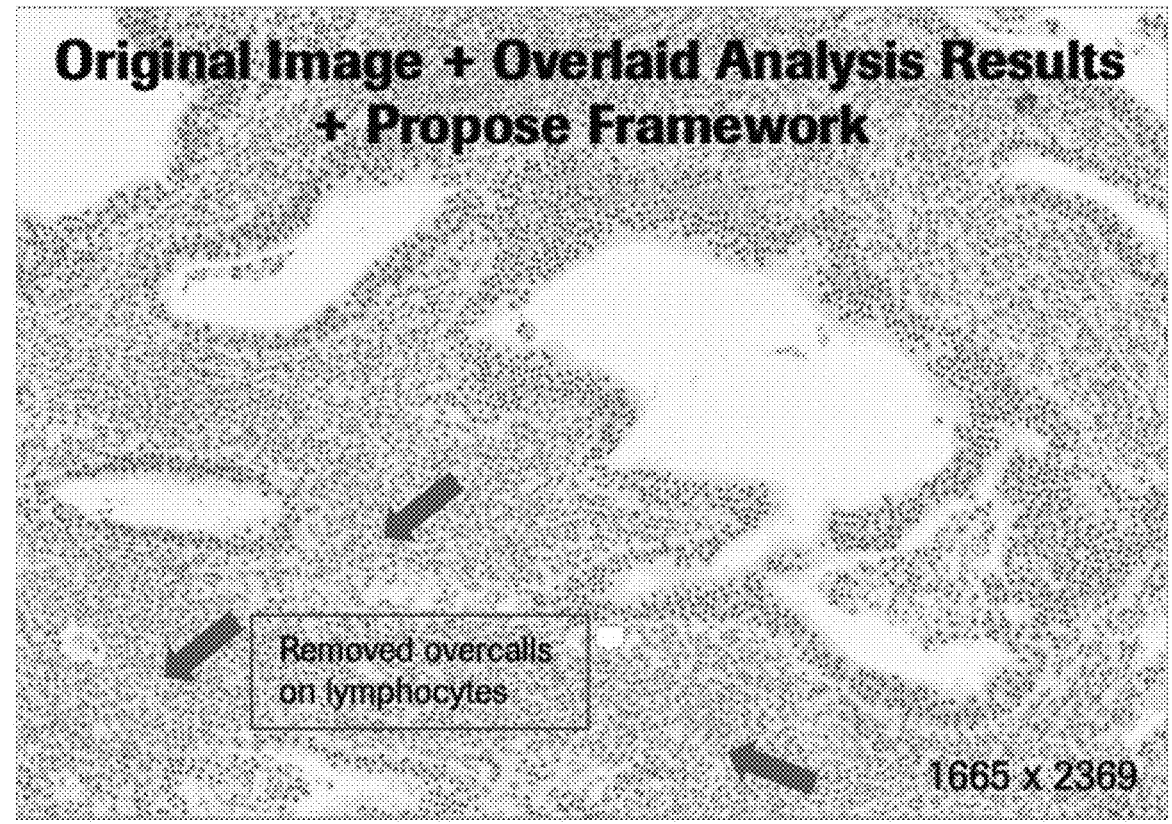
FIG. 9C shows an example of an original image with an overlaid analysis result implemented with the segmentation framework described herein according to various embodiments.

At optional block 935, metrics are derived from various identified nuclei, cells, clusters of cells, and/or biological material or structures, as discussed in detail herein. In some instances, one or more metrics may be computed by applying various image analysis algorithms on pixels contained in or surrounding classified nuclei, cells, clusters of cells, and/or biological material or structures. In some embodiments, the metric includes disease state, area, minor, and major axis lengths, perimeter, radius, solidity, etc. As shown in FIG. 9B, the original image with overlaid analysis results may have a tendency to provide false positives or overcalls of tumor cells, which are in fact lymphoid aggregates or a group of immune cells. However, as shown in FIG. 9C, the original image with overlaid analysis results and implementation of the segmentation framework described herein (i.e., non-target region masked images) is capable of detecting lymphoid aggregates or a group of immune cells and removing the false positives or overcalls of tumor cells. At block 940, the target region masked images or the target region and non-target region masked images are provided. For example, target region masked images or the target region and non-target region masked images may be provided to a memory storage device, provided to a display of a computing device, provided to a user in one or more type of medium such as user interface, etc. In some instances, the providing of the target region masked images or the target region and non-target region masked images includes providing associated metrics or the metric may be provided separately.

IV. Additional Considerations

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

The ensuing description provides preferred exemplary embodiments only, and is not intended to limit the scope, applicability or configuration of the disclosure. Rather, the ensuing description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the following description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

What is claimed is:

1. A computer-implemented method comprising:
    accessing a plurality of images for a specimen, wherein one or more images of the plurality of images comprise a non-target region and a target region;
    splitting the one or more images into image patches having a predetermined size;
    encoding, by a two-dimensional segmentation model, the image patches into discriminative features;
    projecting, by the two-dimensional segmentation model, the discriminative features onto a pixel space;
    determining, by the two-dimensional segmentation model, a classification of a first biological material or structure for each pixel space based on a predetermined threshold;
    predicting, by the two-dimensional segmentation model, segmentation maps for the non-target region based on the discriminative features, wherein the discriminative features are associated with the first biological material or structure;
    generating a segmentation mask for the one or more images based on the segmentation maps;
    applying the segmentation mask to the one or more images to generate non-target region masked images that exclude the non-target region from the one or more images;
    classifying, by an image analysis model, a second biological material or structure within the target region as a type of cell or cell nuclei based on a set of features extracted from the non-target region masked images; and
    providing, for the target region, the type of cell or cell nuclei classified for the second biological material or structure.

2. The computer-implemented method of claim 1, wherein the specimen is stained for one or more biomarkers, the first biological material or structure is a lymphoid aggregate, and the second biological material or structure is a tumor cell or cluster of tumor cells.

3. The computer-implemented method of claim 1, further comprising:
    extracting, by the image analysis model, the set of features from the non-target region masked images; and
    computing one or more metrics for the second biological material or structure based on the set of features,
    wherein the providing the type of cell or cell nuclei classified for the second biological material or structure further comprises providing the one or more metrics for the second biological material or structure.

4. The computer-implemented method of claim 1, wherein the two-dimensional segmentation model is a modified U-Net model comprising a contracting path and an expansive path, each of the contracting path and the expansive path having a maximum of 256 channels, and one or more layers of the contracting path implement spatial drop out.

5. The computer-implemented method of claim 4, wherein the contracting path is configured to encode the image patches into discriminative features.

6. The computer-implemented method of claim 5, wherein the contracting path is configured to encode the image patches into discriminative features at multiple different levels.

7. The computer-implemented method of claim 4, wherein the expansive path is configured to project the discriminative features onto the pixel space.

8. The computer-implemented method of claim 7, wherein the expansive path is configured to project the discriminative features onto the pixel space at multiple different levels.

9. The computer-implemented method of claim 1, wherein the first biological material or structure is associated with the non-target region.

10. The computer-implemented method of claim 1, wherein the predetermined threshold is a hyperparameter that is optimized during training of the two-dimensional segmentation model.

11. A computer-implemented method comprising:
accessing a plurality of images for a specimen, wherein one or more images of the plurality of images comprise a non-target region and a target region;
splitting the one or more images into image patches having a predetermined size;
encoding, by a two-dimensional segmentation model, the image patches into discriminative features;
projecting, by the two-dimensional segmentation model, the discriminative features onto a pixel space;
determining, by the two-dimensional segmentation model, a classification of a first biological material or structure for each pixel space based on a predetermined threshold;
predicting, by the two-dimensional segmentation model, segmentation maps for the non-target region based on the discriminative features, wherein the discriminative features are associated with the first biological material or structure;
generating a first segmentation mask for the one or more images based on the segmentation maps for the non-target region;
classifying, by an image analysis model, a second biological material or structure within the target region as a type of cell or cell nuclei based on a second set of features extracted from the one or more images;
generating a second segmentation mask for the one or more images based on the classification of the second biological material or structure within the target region;
applying the first segmentation mask and the second segmentation mask to the one or more images to generate target region and non-target region masked images that exclude the non-target region from the one or more images; and
providing the target region and non-target region masked images and the type of cell or cell nuclei classified for the second biological material or structure.

12. The computer-implemented method of claim 11, wherein the specimen is stained for one or more biomarkers, the first biological material or structure is a lymphoid aggregate, and the second biological material or structure is a tumor cell or cluster of tumor cells.

13. The computer-implemented method of claim 11, further comprising:
extracting, by the image analysis model, the second set of features from the one or more images; and
computing one or more metrics for the second biological material or structure based on the second set of features,
wherein the providing the target region and non-target region masked images and the type of cell or cell nuclei classified for the second biological material or structure further comprises providing the one or more metrics for the second biological material or structure.

14. The computer-implemented method of claim 11, wherein the two-dimensional segmentation model is a modified U-Net model comprising a contracting path and an expansive path, each of the contracting path and the expansive path having a maximum of 256 channels, and one or more layers of the contracting path implement spatial drop out.

15. The computer-implemented method of claim 14, wherein the contracting path is configured to encode the image patches into discriminative features.

16. The computer-implemented method of claim 15, wherein the contracting path is configured to encode the image patches into discriminative features at multiple different levels.

17. The computer-implemented method of claim 14, wherein the expansive path is configured to project the discriminative features onto the pixel space.

18. The computer-implemented method of claim 17, wherein the expansive path is configured to project the discriminative features onto the pixel space at multiple different levels.

19. The computer-implemented method of claim 11, wherein the first biological material or structure is associated with the non-target region.

20. The computer-implemented method of claim 11, wherein the predetermined threshold is a hyperparameter that is optimized during training of the two-dimensional segmentation model.

* * * * *